United States Patent
Akagawa

(10) Patent No.: US 12,506,388 B2
(45) Date of Patent: Dec. 23, 2025

(54) ENCODER, MOTOR UNIT, AND ACTUATOR

(71) Applicant: IAI CORPORATION, Shizuoka (JP)

(72) Inventor: Hisami Akagawa, Shizuoka (JP)

(73) Assignee: IAI CORPORATION (JP)

( * ) Notice: Subject to any disclaimer, the term of this patent is extended or adjusted under 35 U.S.C. 154(b) by 0 days.

(21) Appl. No.: 18/687,842

(22) PCT Filed: Aug. 24, 2022

(86) PCT No.: PCT/JP2022/031793
§ 371 (c)(1),
(2) Date: Feb. 29, 2024

(87) PCT Pub. No.: WO2023/074097
PCT Pub. Date: May 4, 2023

(65) Prior Publication Data
US 2025/0141316 A1    May 1, 2025

(30) Foreign Application Priority Data
Oct. 25, 2021 (JP) .................. 2021-173621

(51) Int. Cl.
*H02K 11/215* (2016.01)
*F16H 25/20* (2006.01)
(Continued)

(52) U.S. Cl.
CPC ........... *H02K 11/215* (2016.01); *F16H 25/20* (2013.01); *G01B 7/30* (2013.01); *G01D 5/145* (2013.01);
(Continued)

(58) Field of Classification Search
CPC .. H02K 11/215; H02K 11/01; H02K 11/0141; G01D 5/145
(Continued)

(56) References Cited

U.S. PATENT DOCUMENTS

| 2004/0070392 A1 | 4/2004 | Hahn |
| 2018/0010926 A1 | 1/2018 | Forthaus |
| 2024/0175670 A1* | 5/2024 | Saito ............... G01D 5/145 |

FOREIGN PATENT DOCUMENTS

| DE | 102015101248 A1 | 7/2016 |
| EP | 3109599 A1 | 12/2016 |

(Continued)

OTHER PUBLICATIONS

English translation of JP 6430800 (Year: 2018).*
(Continued)

*Primary Examiner* — Randell J Krug
(74) *Attorney, Agent, or Firm* — Thomas|Horstemeyer, LLP

(57) ABSTRACT

An encoder detects rotation of an output shaft of a motor main body. The encoder is provided with a first rotating shaft body, a first permanent magnet, a sensor unit and a first bearing. The first rotating shaft body is coupled to an end portion of the output shaft and rotates in conjunction with rotation of the output shaft. The first permanent magnet is provided at a −Y side end portion of the first rotating shaft body. A sensor of the sensor unit detects changes in magnetic flux density of the first permanent magnet in accordance with rotation of the first rotating shaft body. The first bearing is provided so as to rotatably support the first rotating shaft body. The first bearing surrounds the periphery of the first permanent magnet and is formed of a magnetic shielding material that shields magnetism generated by the first permanent magnet.

13 Claims, 13 Drawing Sheets

(51) Int. Cl.
  *G01B 7/30* (2006.01)
  *G01D 5/14* (2006.01)
  *H02K 7/06* (2006.01)
  *H02K 11/01* (2016.01)

(52) U.S. Cl.
  CPC ........... *H02K 7/06* (2013.01); *H02K 11/0141* (2020.08); *F16H 25/2015* (2013.01); *F16H 2025/2075* (2013.01)

(58) Field of Classification Search
  USPC .................................. 384/42, 492, 527, 907
  See application file for complete search history.

(56) References Cited

FOREIGN PATENT DOCUMENTS

| | | |
|---|---|---|
| JP | 54-153431 A | 12/1979 |
| JP | 60-116802 A | 6/1985 |
| JP | 2007-57236 A | 3/2007 |
| JP | 6430800 B2 * | 11/2018 |

OTHER PUBLICATIONS

International Search Report and Written Opinion for WO 2023/074097 (PCT/JP2022/031793), dated Nov. 1, 2022, pp. 1-9 (Translation Included).
European Search Report for Patent Application No. 22886431.0-1001, dated Sep. 19, 2025, pp. 1-8.

* cited by examiner

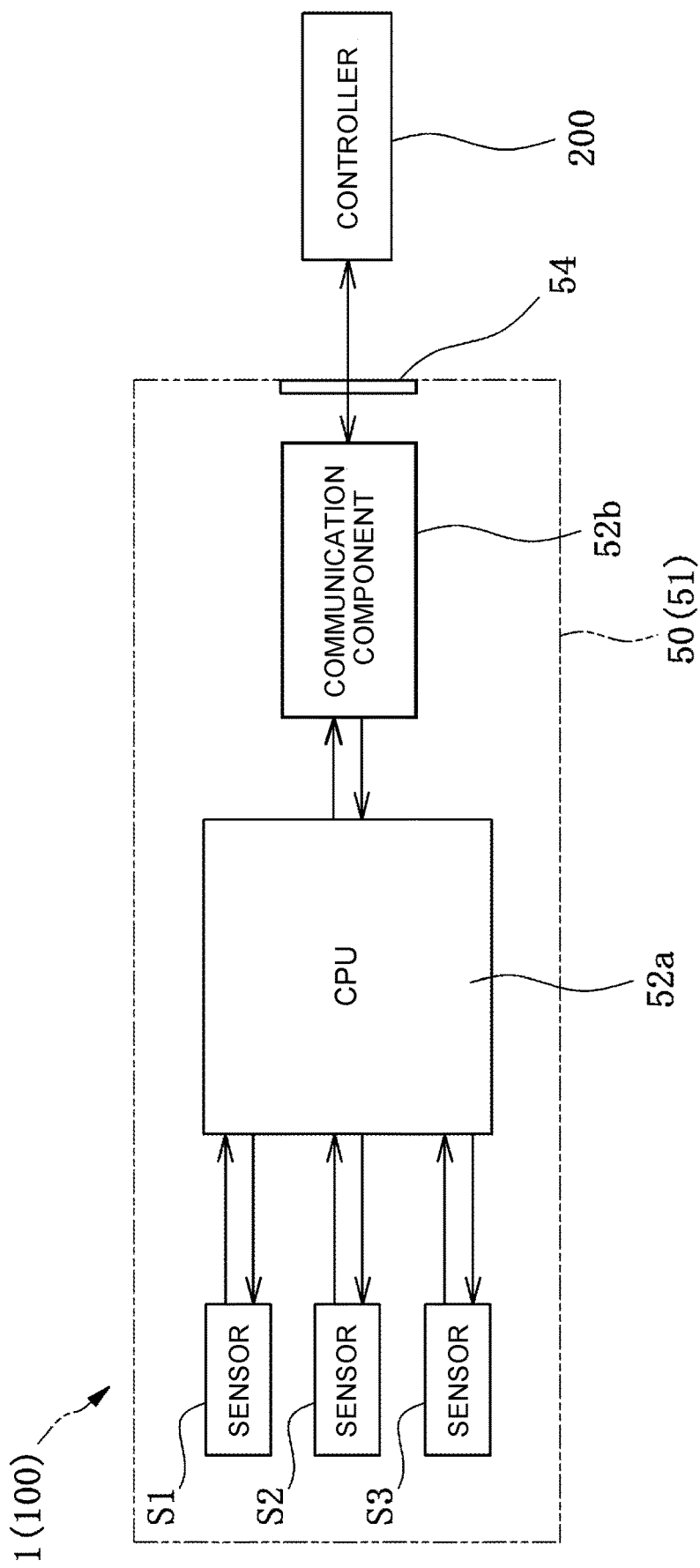

FIG.12
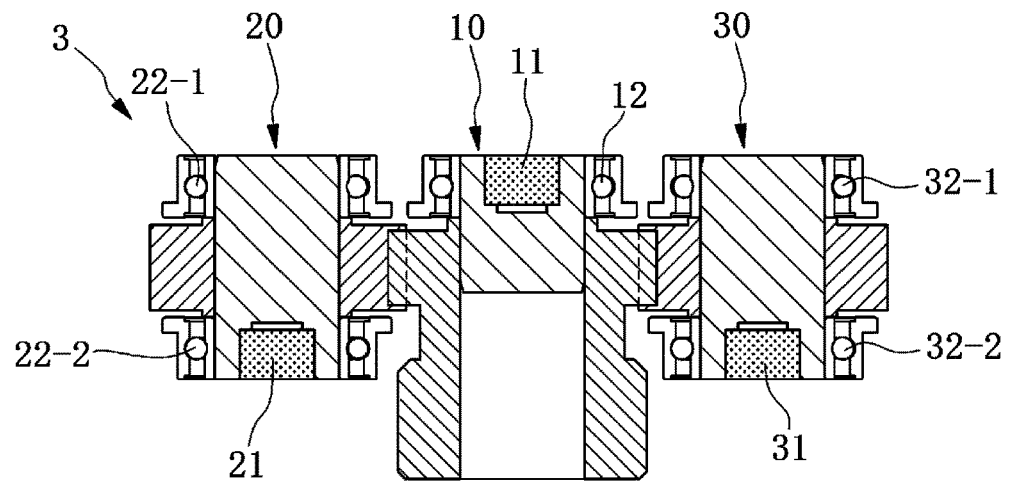
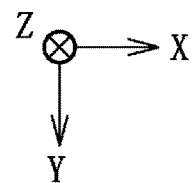
FIG.13
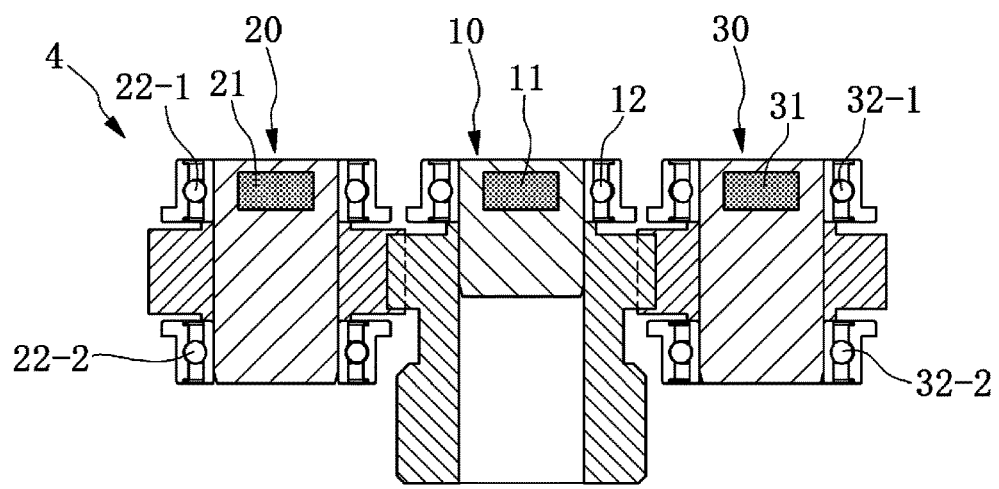
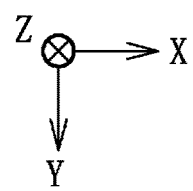

FIG.14
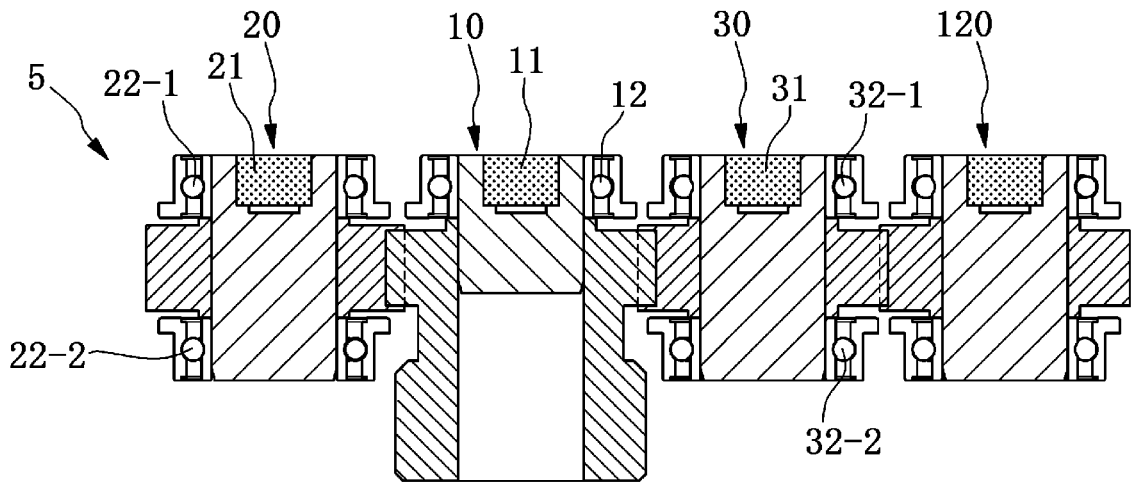
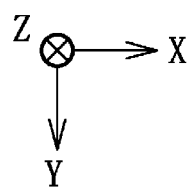
FIG.15
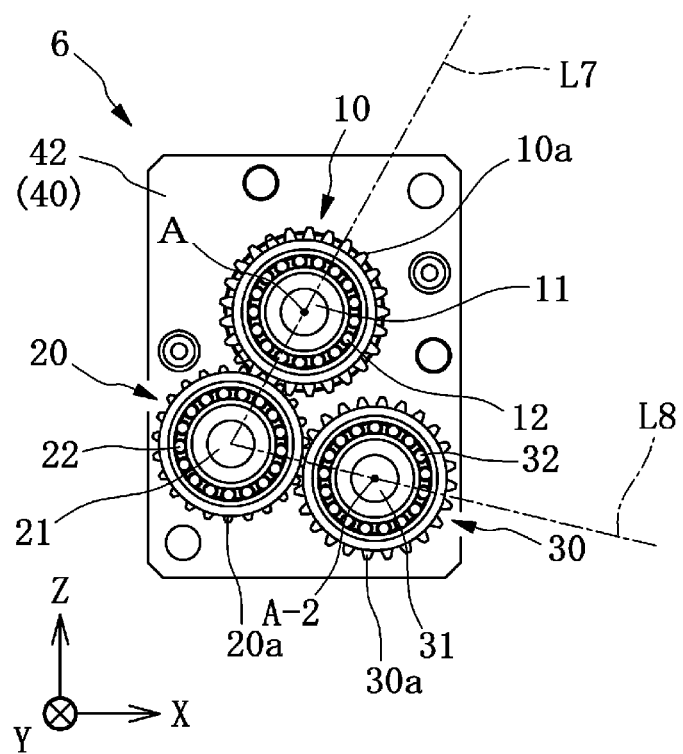

ENCODER, MOTOR UNIT, AND ACTUATOR

CROSS-REFERENCE TO RELATED APPLICATIONS

This application is the National Stage of International Application No. PCT/JP2022/031793, filed Aug. 24, 2022, which claims priority to JP 2021-173621, filed Oct. 25, 2021, which are entirely incorporated herein by reference.

TECHNICAL FIELD

The present invention relates to an encoder, a motor unit and an actuator.

BACKGROUND ART

Japanese Patent No. 6,430,800 discloses a mechanical encoder provided with a case, a main drive gear that is coupled to an output shaft of a motor, a permanent magnet, a bearing that supports the main drive gear to be rotatable with respect to the case, a magnetic interference prevention member (a magnetic shielding member), and a magnetic sensor that detects changes in the magnetic field of the permanent magnet. The encoder is further provided with another permanent magnet that is different from the aforementioned permanent magnet and another magnetic sensor that detects changes in the magnetic field of the another permanent magnet. In this encoder, the permanent magnet is provided at an end portion of the main drive gear. To facilitate detection by the magnetic sensor of magnetism produced by the permanent magnet, an end portion of the main drive gear is provided to protrude from an end face of the bearing to a side thereof at which the magnetic sensor is disposed. The magnetic shielding member is provided so as to surround the periphery of the protruding portion of the main rotating body, and shields magnetism by the permanent magnet provided at the end portion of the main drive gear. The magnetic shielding member reduces effects of magnetism of the permanent magnet of the main drive gear on the magnetic sensor that detects changes in the magnetic field of the another permanent magnet. Thus, the encoder recited in Japanese Patent No. 6,430,800 improves detection accuracy.

RELATED ART REFERENCES

Patent References

Patent Reference 1: Japanese Patent No. 6,430,800

SUMMARY OF INVENTION

Technical Problem

In the encoder recited in Japanese Patent No. 6,430,800, the end portion of the main drive gear is provided protruding from the end face of the bearing to the side at which the magnetic sensor is disposed. Therefore, for example, when a length of the magnetic drive gear in the protruding direction is increased or the like, the size of the encoder may become large. Thus, there is a room for improvement.

The present invention is made in consideration of the circumstances described above and an object of the present invention is to provide an encoder, a motor unit and an actuator that may suppress an increase in size.

Solution to Problem

In order to achieve the object described above, an encoder according to a first aspect of the present invention is for detecting rotation of an output shaft of a motor, the encoder including:
  a first rotating shaft body configured to be coupled to an end portion of the output shaft and configured to rotate in conjunction with rotation of the output shaft;
  a first permanent magnet provided at an end portion of the first rotating shaft body;
  a case accommodating the first rotating shaft body;
  a first sensor disposed so as to oppose the first permanent magnet, the first sensor detecting changes in magnetic flux density of the first permanent magnet in accordance with rotation of the first rotating shaft body; and
  a first bearing rotatably supporting the first rotating shaft body with respect to the case, the first bearing surrounding a periphery of the first permanent magnet and being formed of a magnetic shielding material that shields magnetism generated by the first permanent magnet.

The encoder may include:
  a second rotating shaft body configured to rotate in conjunction with rotation of the first rotating shaft body;
  a second permanent magnet provided at the second rotating shaft body;
  a second bearing rotatably supporting the second rotating shaft body with respect to the case; and
  a second sensor disposed so as to oppose the second permanent magnet, the second sensor detecting changes in magnetic flux density of the second permanent magnet in accordance with rotation of the second rotating shaft body.

The second bearing may surround a periphery of the second permanent magnet and be formed of a magnetic shielding material that shields magnetism generated by the second permanent magnet.

The encoder may include:
  a third rotating shaft body configured to rotate in conjunction with rotation of the first rotating shaft body;
  a third permanent magnet provided at the third rotating shaft body;
  a third bearing rotatably supporting the third rotating shaft body with respect to the case; and
  a third sensor disposed so as to oppose the third permanent magnet, the third sensor detecting changes in magnetic flux density of the third permanent magnet in accordance with rotation of the third rotating shaft body.

The third bearing may surround a periphery of the third permanent magnet and be formed of a magnetic shielding material that shields magnetism generated by the third permanent magnet.

A first gear may be provided at the first rotating shaft body,
  a second gear may be provided at the second rotating shaft body, the second gear meshing with the first gear, and
  the second rotating shaft body may rotate in conjunction with rotation of the first rotating shaft body in accordance with the meshing between the first gear and the second gear.

A third gear may be provided at the third rotating shaft body, the third gear meshing with the first gear of the first rotating shaft body, and the third rotating shaft body may rotate in conjunction with rotation of the first rotating shaft body in accordance with the meshing between the first gear and the third gear.

A third gear may be provided at the third rotating shaft body, the third gear meshing with the second gear of the second rotating shaft body, and the third rotating shaft body may rotate in conjunction with rotation of the first rotating shaft body in accordance with the meshing between the first gear and the second gear and the meshing between the second gear and the third gear.

The second rotating shaft body may be provided with an axial direction thereof being parallel with an axial direction of the first rotating shaft body, and the second permanent magnet may be provided at an end portion of the second rotating shaft body that is at a same side thereof as the end portion of the first rotating shaft body at which the first permanent magnet is provided.

The second rotating shaft body may be provided with an axial direction thereof being parallel with an axial direction of the first rotating shaft body, and the second permanent magnet may be provided at an end portion of the second rotating shaft body that is at an opposite side thereof from the end portion of the first rotating shaft body at which the first permanent magnet is provided.

An end portion of the first bearing in an axial direction of the first rotating shaft body may protrude in the axial direction of the first rotating shaft body relative to an end portion of the first permanent magnet.

An end portion of the first rotating shaft body in an axial direction of the first rotating shaft body may protrude in the axial direction relative to an end portion of the first permanent magnet.

A motor unit according to a second aspect of the present invention includes:

a motor provided with an output shaft; and the encoder according to the first aspect, the encoder detecting rotation of the output shaft of the motor.

An actuator according to a third aspect of the present invention includes:

a moving body; and the motor unit according to the second aspect, the motor unit moving the moving body in accordance with rotation of the output shaft.

Advantageous Effects of Invention

In the present invention, because the first bearing surrounds the periphery of the first permanent magnet, for example, a length in the axial direction of the first rotating shaft body may be reduced. Therefore, the size of the encoder according to the present invention may be reduced. Thus, the present invention may provide an encoder, a motor unit and an actuator that may suppress an increase in size.

BRIEF DESCRIPTION OF DRAWINGS

FIG. 8 is a functional block diagram of the encoder according to the exemplary embodiment of the present invention.

FIG. 12 is a sectional diagram of an encoder according to a second variant example.

FIG. 13 is a sectional diagram of an encoder according to a third variant example.

FIG. 14 is a sectional diagram of an encoder according to a fourth variant example.

FIG. 15 is a front view of an encoder according to a fifth variant example.

DETAILED DESCRIPTION

Figure 1:
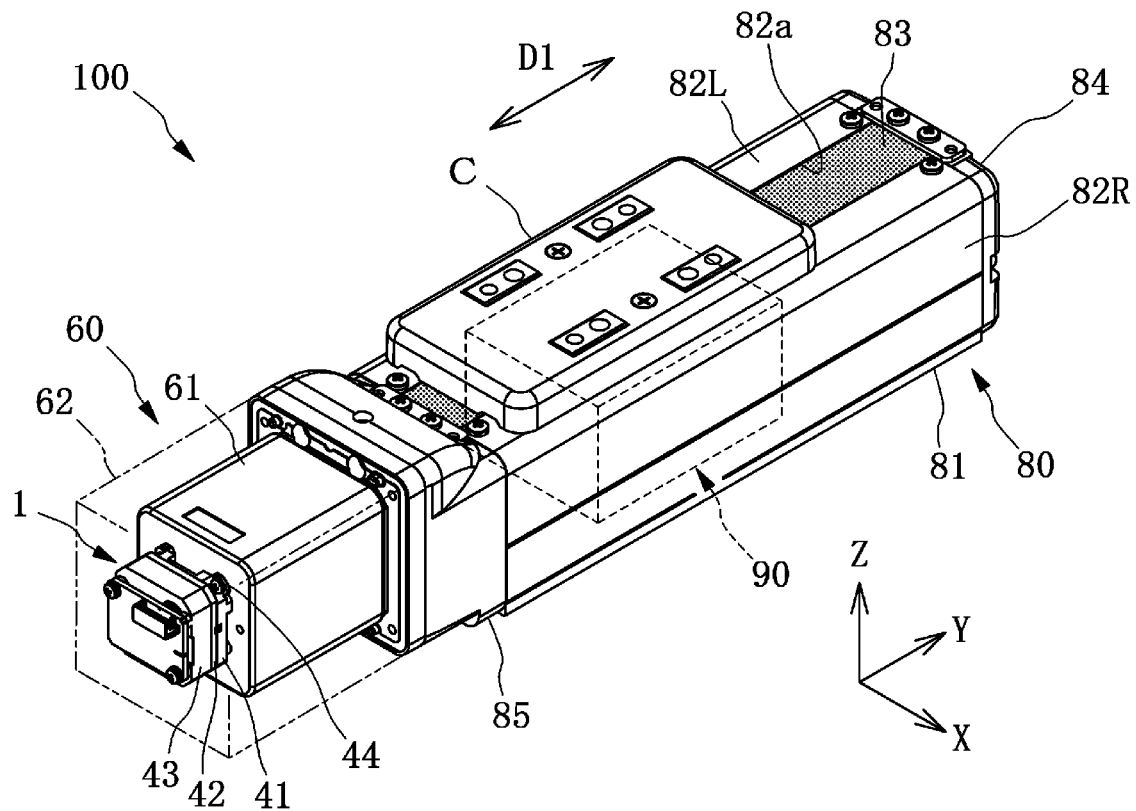
FIG. 1 is a perspective view of an actuator according to an exemplary embodiment of the present invention.

An encoder 1, a motor unit 60 and an actuator 100 according to an exemplary embodiment of the present invention are described. As shown in FIG. 1 a Y-axis direction in the drawings is a direction parallel to a linear motion direction D1 in which a slide cover C advances and retreats. An X-axis direction and a Z-axis direction are directions orthogonal to the linear motion direction D1. The X-Y plane in the drawings is a horizontal plane that is parallel to a surface on which the actuator 100 is placed.

Figure 2:
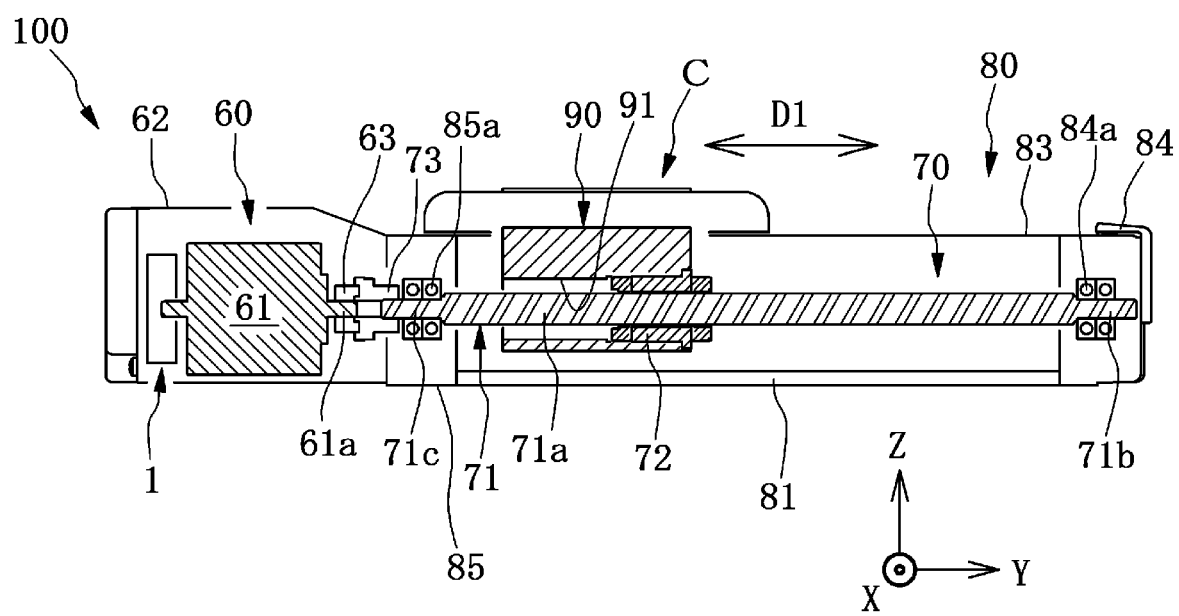
FIG. 2 is a sectional diagram of the actuator according to the exemplary embodiment of the present invention.

In the present exemplary embodiment, the actuator 100 is a slider-type actuator that moves the slide cover C in the linear motion direction D1. As shown in FIG. 2, in addition to the above-mentioned motor unit 60 and slide cover C, the actuator 100 includes a ball screw 70, an actuator housing 80 and a moving body 90.

The motor unit 60 includes a motor main body 61 (a motor), a motor casing 62, a first coupling 63 and the encoder 1, which is a mechanical encoder. The encoder 1 detects rotation of an output shaft 61a of the motor unit 60 (more specifically, rotation angles, rotation numbers and the like of the output shaft 61a.). The motor unit 60 is structured as, for example, a single unit that is attachable to and detachable from the actuator housing 80, but this is not limiting. The motor unit 60 may be integrally fixed so as to disable attachment and detachment from the actuator housing 80.

The motor main body 61 is, for example, a stepper motor, a servo motor or the like. The motor main body 61 includes the output shaft 61*a* (rotating shaft), a rotor, a stator and so forth. Electric power is supplied to the motor main body 61 via an actuator cable from a commercial power source, a DC power supply or the like. When electric power is supplied to the motor main body 61, the rotor of the motor main body 61 rotates. Rotary motion of the rotor is outputted to the output shaft 61*a*. The output shaft 61*a* is connected to a ball screw shaft 71 of the ball screw 70 via a pair of the first coupling 63 and a second coupling 73. The output shaft 61*a* rotates in accordance with the rotary motion of the rotor of the motor main body 61. As a result, the ball screw shaft 71 of the ball screw 70 rotates together with the output shaft 61*a*.

The motor casing 62 accommodates the motor main body 61, thus protecting the motor main body 61.

The first coupling 63 is fixed to the output shaft 61*a* of the motor main body 61. The first coupling 63 engages with the second coupling 73, which is fixed to the ball screw shaft 71 of the ball screw 70. The first coupling 63 transmits rotary motion of the output shaft 61*a* to the ball screw shaft 71 of the ball screw 70.

Figure 3:
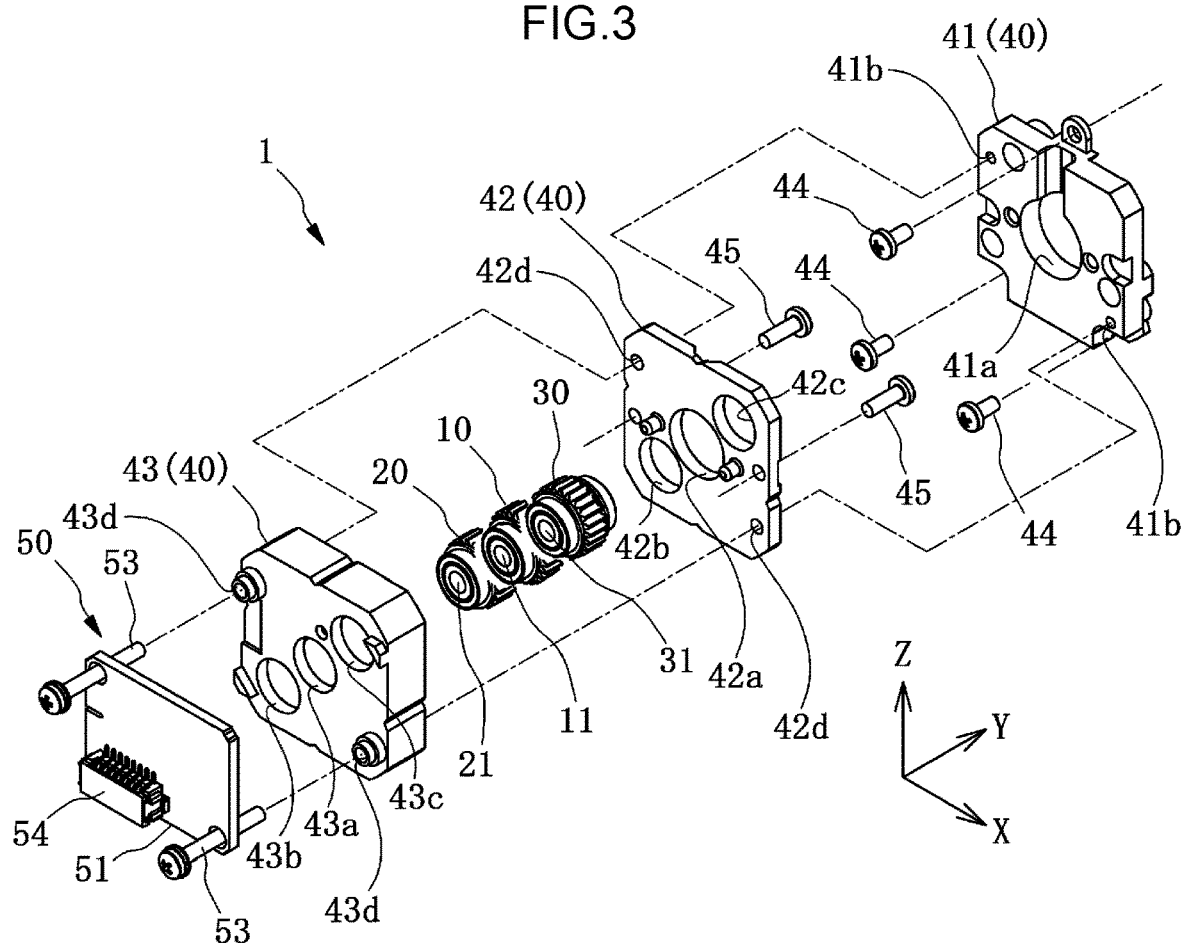
FIG. 3 is an exploded perspective view of an encoder according to the exemplary embodiment of the present invention.
Figure 4A:
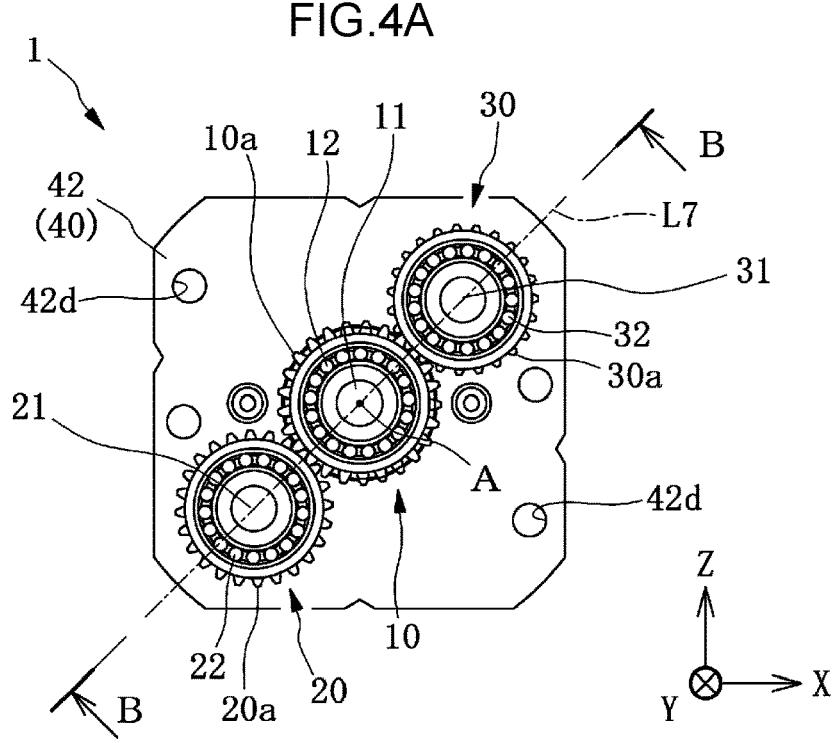
FIG. 4A is a front view of the encoder according to the exemplary embodiment of the present invention.
Figure 4B:
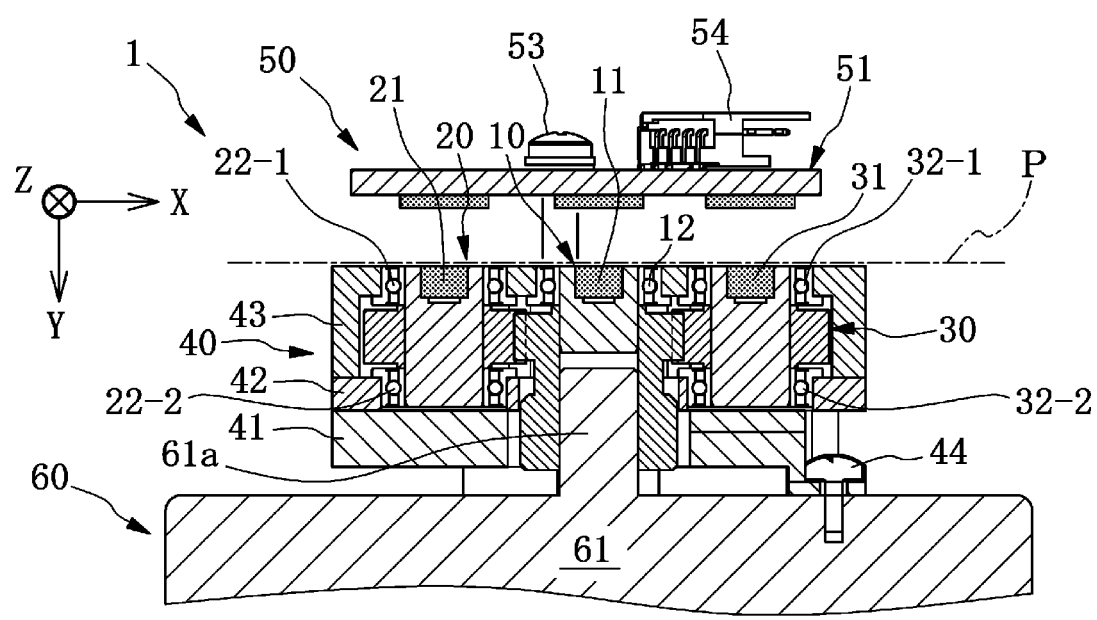
FIG. 4B is a sectional diagram cut along B-B in FIG. 4A.

As shown in FIG. 3, FIG. 4A and FIG. 4B, the encoder 1 is provided with a first rotating shaft body 10, a first permanent magnet 11, a first bearing 12, a second rotating shaft body 20, a second permanent magnet 21, second bearings 22-1 and 22-2, a third rotating shaft body 30, a third permanent magnet 31, third bearings 32-1 and 32-2, a case 40, and a sensor unit 50. The three rotating shaft bodies of the encoder 1, the first rotating shaft body 10, the second rotating shaft body 20 and the third rotating shaft body 30, are used for detecting rotary angles and rotation numbers of the output shaft 61*a* of the motor main body 61. Hence, a controller 200 of the actuator 100 may calculate absolute positions of the moving body 90. The controller 200 is described below.

Figure 5:
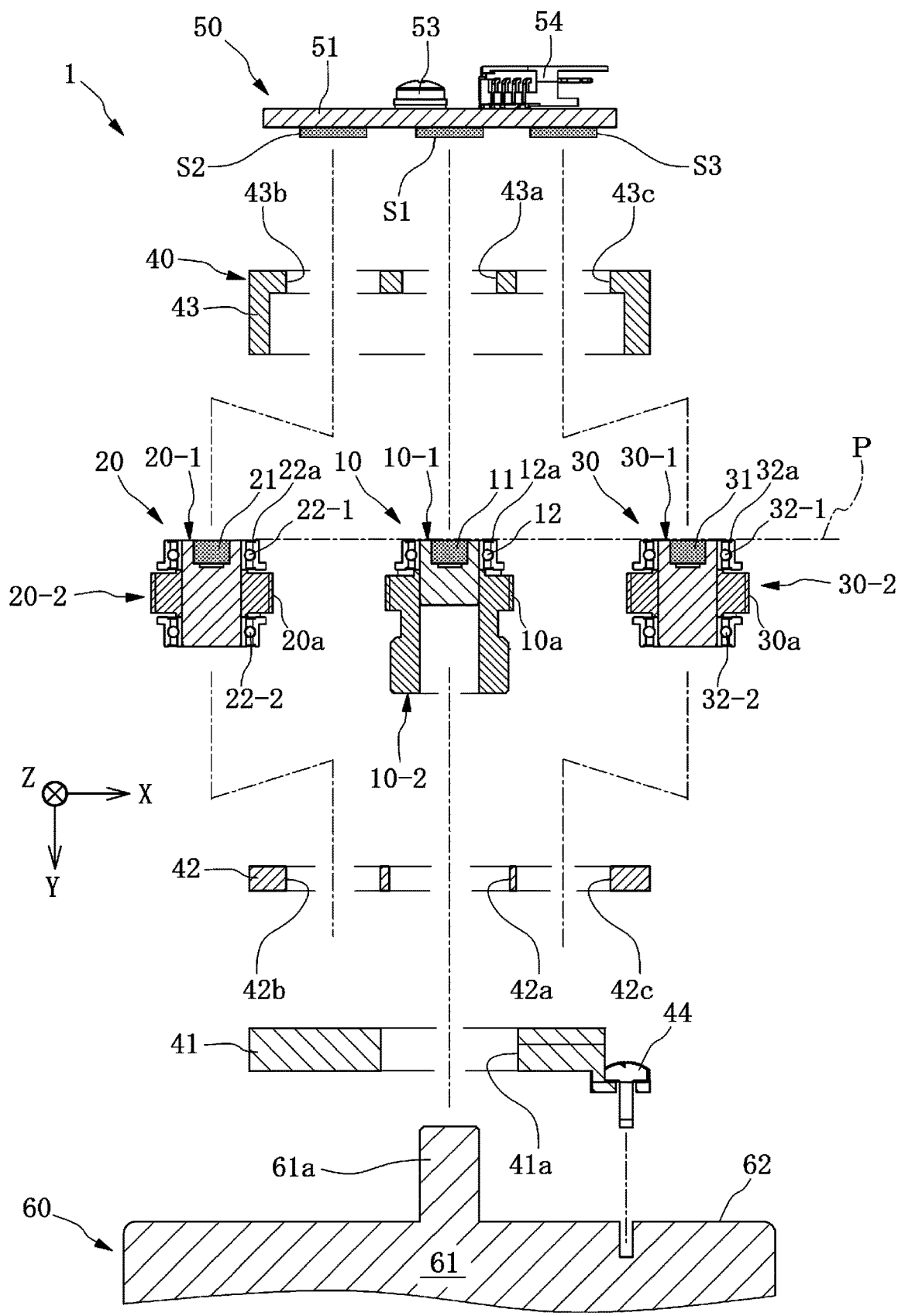
FIG. 5 is an exploded sectional diagram of the encoder according to the exemplary embodiment of the present invention.
Figure 6:
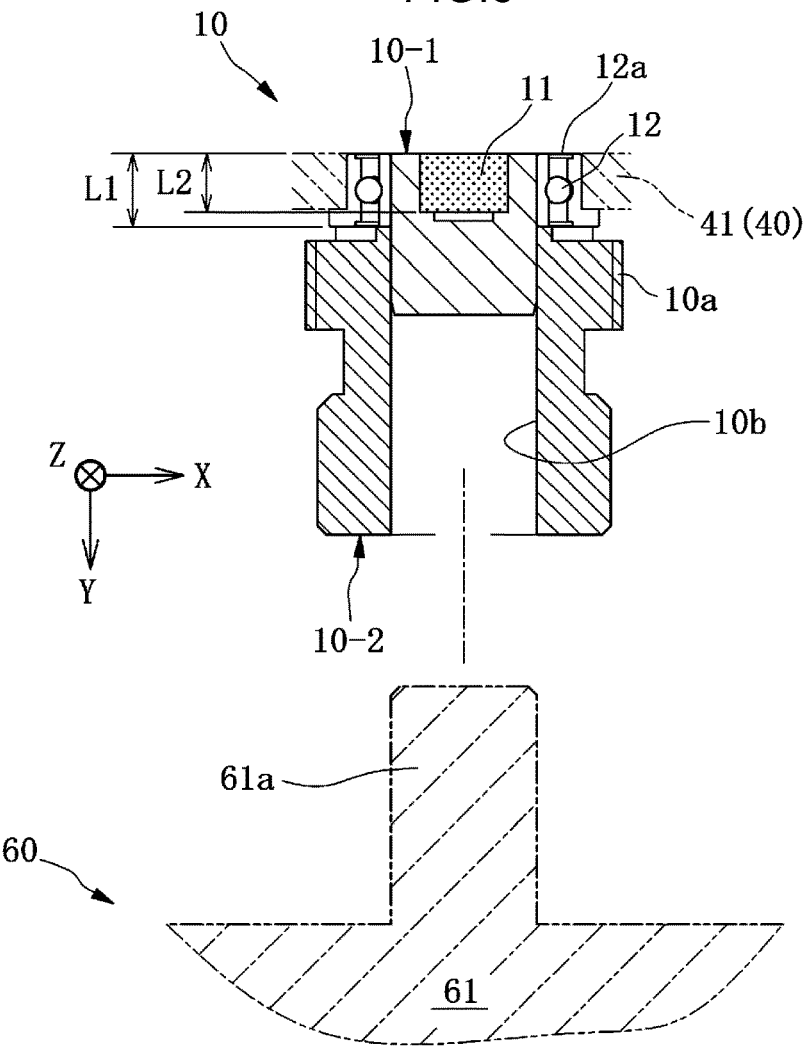
FIG. 6 is a sectional diagram of a first rotating shaft body.

As shown in FIG. 4A, FIG. 4B and FIG. 5, the first rotating shaft body 10 is a member that is formed in a substantially circular rod shape whose axial direction is in the Y-axis direction and that is provided to be rotatable about the Y-axis direction. The first rotating shaft body 10 is formed of, for example, a soft magnetic material. A first gear 10*a* is formed at an outer periphery face of the first rotating shaft body 10. Specifically, as shown in FIG. 6, the first rotating shaft body 10 includes a cylindrical member 10-1 and a tubular member 10-2, in which a penetrating hole 10*b* is formed. The first gear 10*a* is formed at the outer periphery face of the tubular member 10-2. The cylindrical member 10-1 and the output shaft 61*a* are tightly fitted into the penetrating hole 10*b* of the tubular member 10-2 from both sides thereof. Thus, the tubular member 10-2 is coupled to an end portion of the output shaft 61*a* of the motor main body 61, and the first rotating shaft body 10 rotates in conjunction with rotation of the output shaft 61*a*. Therefore, the first rotating shaft body 10 is structured as a main drive shaft that is coupled directly to the output shaft 61*a* of the motor main body 61.

The first permanent magnet 11 is a permanent magnet provided at a −Y side end portion of the first rotating shaft body 10. The first permanent magnet 11 according to the present exemplary embodiment is provided such that a portion thereof is exposed from the end portion of the first rotating shaft body 10, but this is not limiting. The first permanent magnet 11 is attached, fixed or the like to the end portion of the first rotating shaft body 10 by an arbitrary method. For example, the first permanent magnet 11 may be fixed with adhesive or the like to the end face of the −Y side end portion of the first rotating shaft body 10.

The first bearing 12 is provided to rotatably support the first rotating shaft body 10 with respect to the case 40. The first bearing 12 according to the present exemplary embodiment supports the first rotating shaft body 10 at the −Y side end portion of the first rotating shaft body 10. The first bearing 12 is formed of a magnetic shielding material that shields magnetism produced by the first permanent magnet 11, so as to reduce effects of magnetism produced by the first permanent magnet 11 on sensors S2 and S3. The magnetic shielding material of the first bearing 12 is, for example, a soft magnetic material, but this is not limiting. A material other than a soft magnetic material may be used provided the magnetic shielding material of the first bearing 12 can shield magnetism. The first bearing 12 is provided to surround the periphery of the first permanent magnet that is provided at the −Y side end portion of the first rotating shaft body 10. Therefore, the first rotating shaft body 10 is provided such that a −Y side end portion of the first rotating shaft body 10 does not protrude from a −Y side end face 12*a* of the first bearing 12. The first bearing 12 is formed such that a length L1 of the first bearing 12 in the Y-axis direction is greater than a length L2 of the first permanent magnet 11 in the Y-axis direction (L1>L2). Therefore, the first bearing 12 more easily surrounds the periphery of the first permanent magnet 11.

Figure 7A:
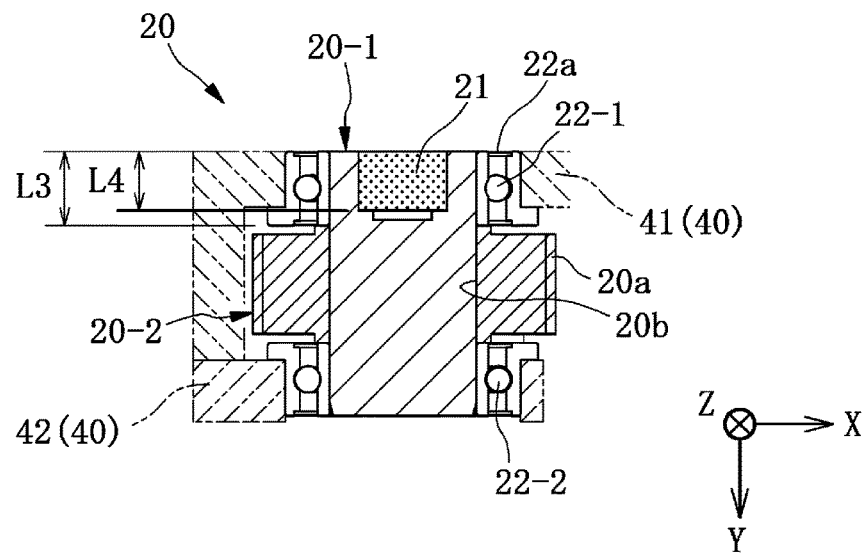
FIG. 7A is a sectional diagram of a second rotating shaft body.

As shown in FIG. 4A, FIG. 4B and FIG. 5, the second rotating shaft body 20 is a member that is formed in a substantially circular rod shape whose axial direction is in the Y-axis direction and that is provided to be rotatable about the Y-axis direction. The second rotating shaft body 20 is formed of, for example, a soft magnetic material. The second rotating shaft body 20 is provided such that the axial direction of the second rotating shaft body 20 is parallel to the axial direction of the first rotating shaft body 10. A second gear 20*a* is formed at an outer periphery face of the second rotating shaft body 20. The second gear 20*a* meshes with the first gear 10*a*. The second rotating shaft body 20 is provided so as to rotate in conjunction with rotation of the first rotating shaft body 10 in accordance with the meshing of the first gear 10*a* with the second gear 20*a*. Specifically, as shown in FIG. 7A, the second rotating shaft body 20 includes a cylindrical member 20-1 and a tubular member 20-2, in which a penetrating hole 20*b* is formed. The second gear 20*a* is formed at an outer periphery face of the tubular member 20-2. The cylindrical member 20-1 is tightly fitted into the penetrating hole 20*b* of the tubular member 20-2. The second rotating shaft body 20 is structured as a passive drive shaft that is indirectly coupled to the output shaft 61*a* of the motor main body 61 via the first rotating shaft body 10.

The second permanent magnet 21 is provided at a −Y side end portion of the second rotating shaft body 20. The second permanent magnet 21 according to the present exemplary embodiment is provided such that a portion thereof is exposed from the end portion of the second rotating shaft body 20, but this is not limiting. The second permanent magnet 21 is attached, fixed or the like to the end portion of the second rotating shaft body 20 by an arbitrary method. For example, the second permanent magnet 21 may be fixed with adhesive or the like to the end face at the −Y side end portion of the second rotating shaft body 20.

The second bearings 22-1 and 22-2 are provided to rotatably support the second rotating shaft body 20 with respect to the case 40. The second bearings 22-1 and 22-2 according to the present exemplary embodiment are provided as a pair and support the second rotating shaft body 20 at the −Y side end portion and a +Y side end portion of the second rotating shaft body 20. The second bearings 22-1 and 22-2 are formed of a magnetic shielding material that shields magnetism produced by the second permanent magnet 21, so as to reduce effects of magnetism produced by the second permanent magnet 21 on sensors S1 and S3. The magnetic shielding material of the second bearings 22-1 and 22-2 is, for example, a soft magnetic material, but this is not limiting. A material other than a soft magnetic material may be used provided the magnetic shielding material of the second bearings 22-1 and 22-2 can shield magnetism. One of the second bearings 22-1 and 22-2, the second bearing 22-1 is provided to surround the periphery of the second permanent magnet 21 that is provided at the −Y side end portion of the second rotating shaft body 20. Therefore, the second rotating shaft body 20 is provided such that a −Y side end portion of the second rotating shaft body 20 does not protrude from a −Y side end face 22a of the second bearing 22. The second bearing 22 provided at the −Y side end portion is formed such that a length L3 of the second bearing 22 in the Y-axis direction is greater than a length L4 of the second permanent magnet 21 in the Y-axis direction (L3>L4). Therefore, the second bearing 22 more easily surrounds the periphery of the second permanent magnet 21.

Figure 7B:
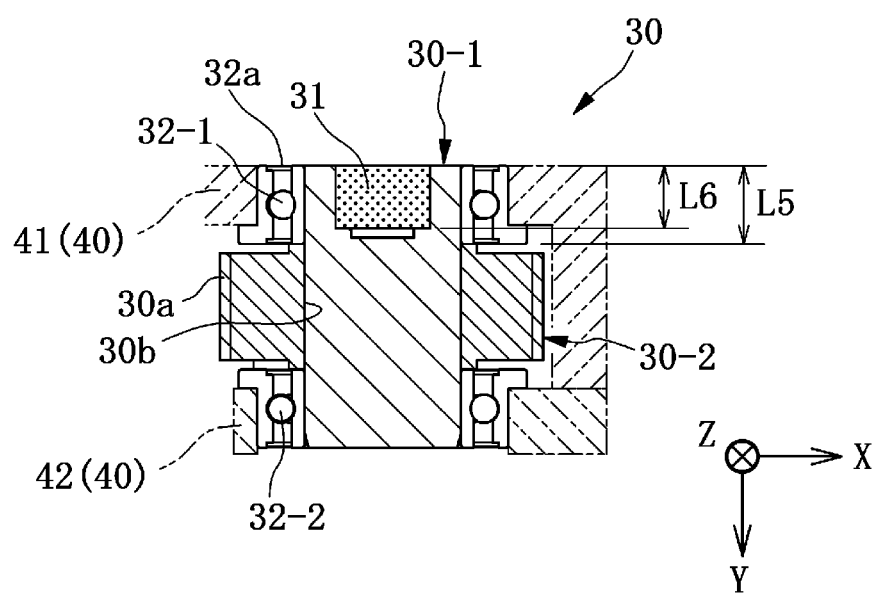
FIG. 7B is a sectional diagram of a third rotating shaft body.

As shown in FIG. 4A, FIG. 4B and FIG. 5, the third rotating shaft body 30 is a member that is formed in a substantially circular rod shape whose axial direction is in the Y-axis direction and that is provided to be rotatable about the Y-axis direction. The third rotating shaft body 30 is formed in a generally similar shape to the second rotating shaft body 20. The third rotating shaft body 30 is formed of, for example, a soft magnetic material. The third rotating shaft body 30 is provided such that the axial direction of the third rotating shaft body 30 is parallel to the axial directions of the first rotating shaft body 10 and the second rotating shaft body 20. A third gear 30a is formed at an outer periphery face of the third rotating shaft body 30. The third gear 30a meshes with the first gear 10a. The third rotating shaft body 30 is provided so as to rotate in conjunction with rotation of the first rotating shaft body 10 in accordance with the meshing of the first gear 10a with the third gear 30a. Specifically, as shown in FIG. 7B, the third rotating shaft body 30 includes a cylindrical member 30-1 and a tubular member 30-2, in which a penetrating hole 30b is formed. The third gear 30a is formed at an outer periphery face of the tubular member 30-2. The cylindrical member 30-1 is tightly fitted into the penetrating hole 30b of the tubular member 30-2. Similarly to the second rotating shaft body 20, the third rotating shaft body 30 is structured as a passive drive shaft that is indirectly coupled to the output shaft 61a of the motor main body 61 via the first rotating shaft body 10.

The third permanent magnet 31 is provided at a −Y side end portion of the third rotating shaft body 30. The third permanent magnet 31 according to the present exemplary embodiment is provided such that a portion thereof is exposed from the end portion of the third rotating shaft body 30, but this is not limiting. The third permanent magnet 31 is attached, fixed or the like to the end portion of the third rotating shaft body 30 by an arbitrary method. For example, the third permanent magnet 31 may be fixed with adhesive or the like to the end face at the −Y side end portion of the third rotating shaft body 30.

The third bearings 32-1 and 32-2 are provided to rotatably support the third rotating shaft body 30 with respect to the case 40. The third bearings 32-1 and 32-2 according to the present exemplary embodiment are provided as a pair and support the third rotating shaft body 30 at the −Y side end portion and a +Y side end portion of the third rotating shaft body 30. The third bearings 32-1 and 32-2 are formed from a magnetic shielding material that shields magnetism produced by the third permanent magnet 31, so as to reduce effects of magnetism produced by the third permanent magnet 31 on the sensors S1 and S2. The magnetic shielding material of the third bearings 32-1 and 32-2 is, for example, a soft magnetic material, but this is not limiting. A material other than a soft magnetic material may be used provided the magnetic shielding material of the third bearings 32-1 and 32-2 can shield magnetism. One of the third bearings 32-1 and 32-2, the third bearing 32-1 is provided to surround the periphery of the third permanent magnet that is provided at the −Y side end portion of the third rotating shaft body 30. Therefore, the third rotating shaft body 30 is provided such that a −Y side end portion of the third rotating shaft body 30 does not protrude from a −Y side end face 32a of the third bearing 32. The third bearing 32 provided at the −Y side end portion is formed such that a length L5 of the third bearing 32 in the Y-axis direction is greater than a length L6 of the third permanent magnet 31 in the Y-axis direction (L5>L6). Therefore, the third bearing 32 more easily surrounds the periphery of the third permanent magnet 31.

In the present exemplary embodiment, as shown in FIG. 4A, FIG. 4B and FIG. 5, the −Y side end face of the first rotating shaft body 10, the −Y side end face 12a of the first bearing 12, the −Y side end face of the second rotating shaft body 20, the −Y side end face 22a of the second bearing 22, the −Y side end face of the third rotating shaft body 30 and the −Y side end face 32a of the third bearing 32 are disposed in the same plane P, which is orthogonal to the Y-axis direction. As shown in FIG. 4A, the first rotating shaft body 10, the second rotating shaft body 20 and the third rotating shaft body 30 are arranged in a row along a line L7 that passes through an axial center A of the first rotating shaft body 10 and is orthogonal to the Y-axis direction.

As shown in FIG. 3 and FIG. 5, the case 40 accommodates and protects structural members of the encoder 1. In the present exemplary embodiment, the case 40 includes a first case member 41, a second case member 42 and a third case member 43, which are superposed in this order in the Y-axis direction to form the case 40.

The first case member 41 is a plate-shaped member that is constituted as a portion at a rear end side (+Y side) of the case 40. The first case member 41 is fixed to the motor casing 62 of the motor unit 60 by a fastener 44. A penetrating hole 41a is formed penetrating through the first case member 41 in the Y-axis direction. The first rotating shaft body 10 is inserted into and disposed in the penetrating hole 41a.

The second case member 42 is a plate-shaped member that is disposed between the first case member 41 and the third case member 43. The second case member 42 is fixed to the third case member 43 by fasteners 45. Three penetrating holes 42a, 42b and 42c are formed penetrating through the second case member 42 in the Y-axis direction. The first rotating shaft body 10, the second rotating shaft body 20 and the third rotating shaft body 30 are inserted into and disposed in, respectively, the three penetrating holes 42a, 42b and 42c.

The third case member 43 is a lid-shaped member that is structured to be a portion at a front end side (−Y side) of the case 40. Three penetrating holes 43a, 43b and 43c are formed penetrating through the third case member 43 in the Y-axis direction. The first rotating shaft body 10, the second rotating shaft body 20 and the third rotating shaft body 30 are inserted into and disposed in, respectively, the three penetrating holes 43a, 43b and 43c. For example, as shown in FIG. 4B, the −Y side end face of the third case member 43 is disposed in the same plane P as the −Y side end faces or the like of the first rotating shaft body 10, the second rotating shaft body 20 and the third rotating shaft body 30. Thus, the −Y side end faces or the like of the first rotating shaft body 10, second rotating shaft body 20 and third rotating shaft body 30 are exposed through the −Y side end face of the third case member 43. Disposing the −Y side end face of the third case member 43 in the same plane P as the −Y side end faces or the like of the first rotating shaft body 10, second rotating shaft body 20 and third rotating shaft body 30 is an example and is not limiting. The −Y side end face of the third case member 43 need not be disposed in the plane P but may be protruded from the plane P or the like.

The sensor unit 50 includes a circuit board 51, the sensors S1, S2 and S3, a central processing unit (CPU) 52a and a communication component (circuit) 52b. As shown in FIG. 8, the sensors S1, S2 and S3, the CPU 52a and the communication component 52b are mounted on the circuit board 51. The controller 200, which is an external device, is connected to the circuit board 51. As shown in FIG. 4A, FIG. 4B and FIG. 5, the sensor unit 50 is used for detecting rotation angles of the output shaft 61a of the motor unit 60 and calculating rotation numbers of the output shaft 61a, from changes in the magnetic fields of the first permanent magnet 11, the second permanent magnet 21 and the third permanent magnet 31 (more specifically, changes in magnetic flux density) due to rotations of the first rotating shaft body 10, the second rotating shaft body 20 and the third rotating shaft body 30. The sensor unit 50 is also used for sending signals corresponding to the rotation angles and rotation numbers to the controller 200 for control of the actuator 100 (the motor main body 61).

A mounting face of the circuit board 51 at which the sensors S1, S2 and S3 are mounted is provided so as to oppose the −Y side end face of the third case member 43. Thus, the sensors S1, S2 and S3 are disposed so as to oppose the first permanent magnet 11, the second permanent magnet 21 and the third permanent magnet 31. The sensors S1, S2 and S3, together with the first, second and third permanent magnets 11, 21 and 31, are disposed on the respective axes (on lines along the Y axis) of the first, second and third rotating shaft bodies 10, 20 and 30. The sensors S1, S2 and S3 are arrayed predetermined distances (gaps) apart from the −Y side end faces of the first, second and third permanent magnets 11, 21 and 31 on the axes of the first, second and third rotating shaft bodies 10, 20 and 30. The meaning of the term "predetermined distances (gaps)" as used herein is intended to include distances sufficient for the sensors S1, S2 and S3 to detect changes in magnetic flux density of the corresponding first, second and third permanent magnets 11, 21 and 31.

As shown in FIG. 3, FIG. 4A and FIG. 4B, the circuit board 51 is supported at the third case member 43 of the case 40 by support members 53 that are capable of adjusting the gaps between the sensors S1, S2 and S3 and the first permanent magnet 11, second permanent magnet 21 and third permanent magnet 31. In the present exemplary embodiment, each support member 53 is a bolt that is screwed into a screw hole 43d formed at the third case member 43. The support member 53 is also screwed into a screw hole 42d formed at the second case member 42 and a screw hole 41b formed at the first case member 41. By the support members 53 being screwed into the screw holes 43d, 42d and 41b, the circuit board 51, the first case member 41, the second case member 42 and the third case member 43, including the sensor unit 50, are integrated. A connector 54 is mounted at a −Y side face of the circuit board 51, which is the opposite side of the circuit board 51 from the face at which the sensors S1, S2 and S3 are mounted. The controller 200 (see FIG. 8) is connected to the connector 54 via a cable.

As shown in FIG. 4A, FIG. 4B and FIG. 5, the sensors S1, S2 and S3 are magnetic sensors that detect changes in magnetic flux density of the first permanent magnet 11, the second permanent magnet 21 and the third permanent magnet 31. The sensors S1 to S3 are constituted with, for example, Hall elements, detecting changes in magnetic flux density of the first permanent magnet 11, the second permanent magnet 21 and the third permanent magnet 31 and outputting voltage signals corresponding to the detected changes in magnetic flux density. As shown in FIG. 8, the voltage signals are outputted to the CPU 52a of the sensor unit 50. These voltage signals correspond to rotation angles (absolute angles) of the first, second and third rotating shaft bodies 10, 20 and 30. In the present exemplary embodiment 1, the sensors S1, S2 and S3 are constituted with Hall elements, but this is not limiting. The sensors S1, S2 and S3 may be magnetoresistive (MR) sensors constituted with magnetoresistance effect elements.

As shown in FIG. 4A, FIG. 4B and FIG. 8, the CPU 52a processes the voltage signals inputted from the sensors S1, S2 and S3 and calculates rotation angles (absolute angles) of the first, second and third rotating shaft bodies 10, 20 and 30. A rotation angle of the first rotating shaft body 10 is the same as a rotation angle of the output shaft 61a of the motor main body 61. Therefore, when the CPU 52a calculates the rotation angle of the first rotating shaft body 10, the CPU 52a may also calculate the rotation angle (absolute angle) of the output shaft 61a. The CPU 52a also calculates rotation numbers of the output shaft 61a on the basis of the rotation angles of the first, second and third rotating shaft bodies 10, 20 and 30. The CPU 52a outputs signals corresponding to the calculated rotation angles of the first, second and third rotating shaft bodies 10, 20 and 30 and rotation numbers of the output shaft 61a to the controller 200.

The communication component 52b is a circuit component that conducts communications between the controller 200 of the actuator 100, which controller is disposed externally, and the CPU 52a.

The controller 200 includes, for example, a central processing unit (CPU), a memory section, a display section, an entry section, an interface section and so forth. As shown in FIG. 2 and FIG. 8, the controller 200 calculates absolute positions of the moving body 90 on the basis of the signals from the CPU 52a. The controller 200 controls operations of the actuator 100 (the motor main body 61). Details of operations of the actuator 100 are specified by a teaching pendant or the like that is connected to the controller 200 and are memorized in the memory section of the controller 200. The CPU of the controller 200 reads a program, data and the like from the memory section, and executes the program to operate the actuator 100 (the motor main body 61).

In addition to the motor unit 60 structured as described above, as shown in FIG. 1 and FIG. 2, the actuator 100 is further provided with the ball screw 70, the actuator housing 80 and the moving body 90.

The ball screw 70 includes the ball screw shaft 71 and a ball screw nut 72, which is threaded onto the ball screw shaft 71.

The ball screw shaft 71 directly moves the ball screw nut 72 in accordance with the threading engagement with the ball screw nut 72. The ball screw shaft 71 includes a ball screw shaft main body 71a and end portions 71b and 71c. An outer periphery face of the ball screw shaft main body 71a is structured as a ball screw face with a thread shape. The end portions 71b and 71c are formed with smaller diameters than the ball screw shaft main body 71a. Of the end portions 71b and 71c, the second coupling 73 is fixed to the end portion 71c at the −Y side. The second coupling 73 is engaged with the first coupling 63 that is fixed to the output shaft 61a of the motor unit 60.

The ball screw nut 72 is disposed at the outer periphery of the ball screw shaft main body 71a. The ball screw nut 72 is tightly fitted onto the ball screw shaft 71 via plural ball screw rollers. When the ball screw rollers roll, rotary movement of the ball screw shaft 71 is smoothly converted to linear movement of the ball screw nut 72. The ball screw nut 72 is fixed with respect to the moving body 90 by fasteners such as bolts, screws or the like.

The actuator housing 80 accommodates and protects the ball screw 70 and the moving body 90. The actuator housing 80 includes, for example, a base 81, a pair of side covers 82R and 82L, a seat member 83, a front bracket 84 and a rear bracket 85.

A rail is provided at the base 81. The moving body 90 is supported at the rail of the base 81 via linear guide rollers. When the linear guide rollers roll along the rail, the moving body 90 smoothly moves reciprocatingly in the linear motion direction D1 relative to the base 81.

The side covers 82R and 82L structure side wall portions at both sides of the actuator housing 80. Together with the base 81, the side covers 82R and 82L protect structural components inside the actuator 100.

The seat member 83 is a substantially rectangular stainless steel sheet whose length direction is in the Y-axis direction. The seat member 83 covers an opening portion 82a between the side cover 82R and the side cover 82L. A +Y side end portion of the seat member 83 is fixed to the front bracket 84. A −Y side end portion of the seat member 83 is fixed to the rear bracket 85.

The front bracket 84 is fixed to the +Y side end side of the base 81. The front bracket 84 includes, for example, a bearing 84a. The front bracket 84 rotatably supports the end portion 71b of the ball screw shaft 71 with this bearing 84a.

The rear bracket 85 is fixed to a −Y side end portion of the base 81. The rear bracket 85 includes, for example, a bearing 85a. The rear bracket 85 rotatably supports the end portion 71c of the ball screw shaft 71 with this bearing 85a.

The moving body 90 slidingly moves in both the +Y direction and the −Y direction together with the ball screw nut 82. A penetrating hole 91 that penetrates in the Y-axis direction is formed in the moving body 90. The ball screw shaft 71 is inserted into the penetrating hole 91, in addition to which the ball screw nut 72 is inserted into and fixed at the penetrating hole 91. The slide cover C is attached to the moving body 90 from the upper side (the +Z side) thereof. The seat member 83 penetrates through the slide cover C in the Y-axis direction. Therefore, the slide cover C is movable in the linear motion direction D1 along the seat member 83.

Now, calculations of rotation numbers of the first rotating shaft body 10 from rotation angles of the first rotating shaft body 10 that serves as the main drive shaft and rotation angles of the second rotating shaft body 20 and third rotating shaft body 30 that serve as passive drive shafts, and calculations of absolute positions of the moving body 90, are described using FIG. 2, FIG. 4A, FIG. 4B, FIG. 8, FIG. 9A and FIG. 9B.

First, as depicted in FIG. 4A, FIG. 4B and FIG. 5, the sensors S1, S2 and S3 of the sensor unit 50 detect changes in magnetic flux densities of the first permanent magnet 11, second permanent magnet 21 and third permanent magnet 31 according to rotations of the first rotating shaft body 10, second rotating shaft body 20 and third rotating shaft body 30. As shown in FIG. 8, the sensors S1, S2 and S3 output voltage signals corresponding to the rotation angles (absolute angles) of the first second and third rotating shaft bodies 10, 20 and 30 to the CPU 52a.

Then, on the basis of the voltage signals inputted from the sensors S1, S2 and S3, the CPU 52a calculates rotation angles (absolute angles) of the first, second and third rotating shaft bodies 10, 20 and 30 and a rotation angle (absolute angle) of the output shaft 61a of the motor unit 60. On the basis of these rotation angles (absolute angles), the CPU 52a calculates a rotation number of the first rotating shaft body 10 (the output shaft 61a) as described below.

The calculation of the rotation number of the first rotating shaft body 10 (the output shaft 61a) is conducted using the rotation angle of the second rotating shaft body 20 and the rotation angle of the third rotating shaft body 30. A number of teeth $N_1$ of the first gear 10a of the first rotating shaft body 10, a number of teeth $N_2$ of the second gear 20a of the second rotating shaft body 20 and a number of teeth $N_3$ of the third gear 30a of the third rotating shaft body 30 are specified so as to be respectively different and mutually prime. In the present exemplary embodiment, the number of teeth $N_1$ of the first gear 10a is set to 25, the number of teeth $N_2$ of the second gear 20a is set to 24, and the number of teeth $N_3$ of the third gear 30a is set to 23. However, the numbers of teeth $N_1$, $N_2$ and $N_3$ are not limited thus. The numbers of teeth $N_1$, $N_2$ and $N_3$ may be numbers other than 25, 24 and 23.

As shown in FIG. 2, FIG. 4A and FIG. 4B, a maximum value of the absolute position of the moving body 90 that can be calculated is determined by a number of combinations of the rotation angle of the second rotating shaft body 20 and the rotation angle of the third rotating shaft body 30 relative to the rotation angle of the first rotating shaft body 10. The greater the number of these combinations, the greater an absolute position of the moving body 90 that can be calculated. That is, a maximum value of the absolute position of the moving body 90 that should be calculated is determined by a distance the moving body 90 can move in the linear motion direction D1. Therefore, the number of teeth $N_1$ of the first gear 10a, the number of teeth $N_2$ of the second gear 20a and the number of teeth $N_3$ of the third gear 30a are specified in accordance with the distance the moving body 90 is capable of moving in the linear motion direction D1.

Figure 9A:
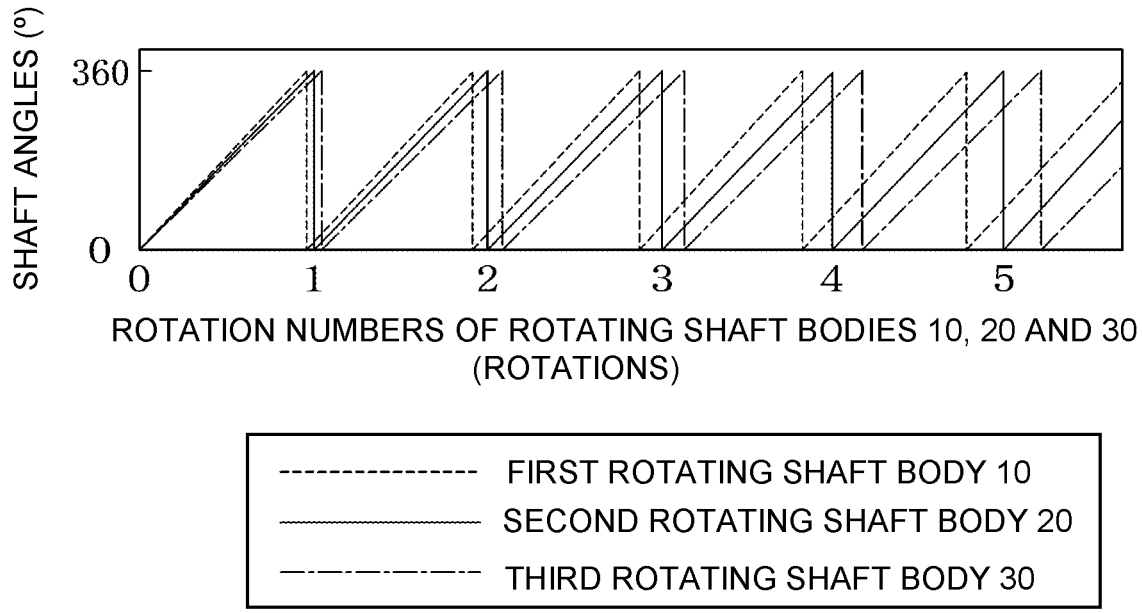
FIG. 9A is a first graph showing relationships between rotary angles and rotation numbers of the first rotating shaft body, second rotating shaft body and third rotating shaft body of the encoder.
Figure 9B:
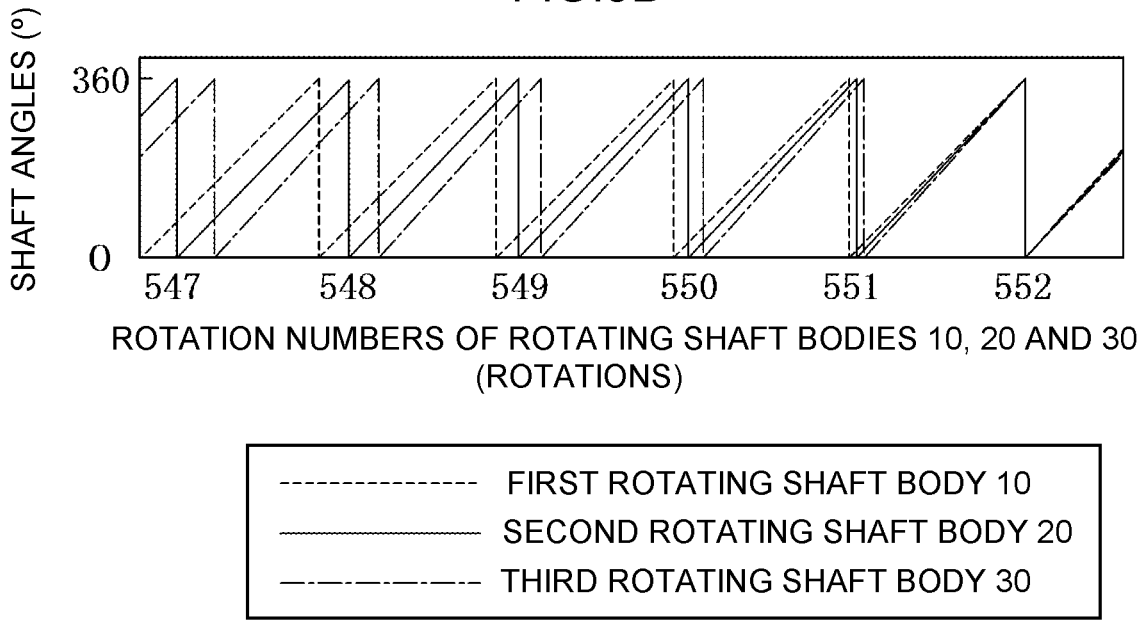
FIG. 9B is a second graph showing the relationships between rotary angles and rotation numbers of the first rotating shaft body, second rotating shaft body and third rotating shaft body of the encoder.

As the first rotating shaft body 10 rotates, offsets arise in the rotation angles of the second rotating shaft body 20 and the third rotating shaft body 30 relative to the rotation angle of the first rotating shaft body 10, as illustrated by the graphs in FIG. 9A and FIG. 9B. In FIG. 9A and FIG. 9B, the horizontal axis shows rotation numbers of the first rotating shaft body 10, the second rotating shaft body 20 and the third rotating shaft body 30 and the vertical axis shows rotation angles of the first rotating shaft body 10, the second rotating shaft body 20 and the third rotating shaft body 30.

As shown in FIG. 9A, before rotation of the first rotating shaft body 10 begins, the rotation angles of the first rotating shaft body 10, the second rotating shaft body 20 and the third rotating shaft body 30 coincide. When the rotation begins, the moving body 90 is in a state of being disposed furthest to a base end side (the −Y side, which is the left side in FIG. 2). The origin point of the position of the moving body 90 before rotation begins is the absolute position of the moving body 90 and therefore is a position at which the rotation number of the ball screw shaft 71 is zero. From this state before the beginning of rotation of the first rotating shaft body 10, it is assumed that the first rotating shaft body 10 turns forward and the moving body 90 advances in the +Y direction.

In conjunction with the rotation of the first rotating shaft body 10, the second rotating shaft body 20 and the third rotating shaft body 30 also rotate, and an offset arises in the rotation angle of the second rotating shaft body 20 relative to the rotation angle of the first rotating shaft body 10. In addition, offsets arise in the rotation angle of the third rotating shaft body 30 relative to the rotation angles of both the first rotating shaft body 10 and the second rotating shaft body 20. These offsets steadily increase with rotation of the first rotating shaft body 10.

As the first rotating shaft body 10 continues to rotate, at a certain time the offset between the rotation angle of the first rotating shaft body 10 and the rotation angle of the second rotating shaft body 20 or the third rotating shaft body 30 reaches a maximum. Subsequently, as shown in FIG. 9B, the offset between the rotation angle of the first rotating shaft body 10 and the rotation angle of the second rotating shaft body 20 or third rotating shaft body 30 steadily decreases. Eventually, the rotation angles of the first rotating shaft body 10, the second rotating shaft body 20 and the third rotating shaft body 30 coincide again, returning to the state before rotation of the first rotating shaft body 10 began.

While the rotation angles of the first rotating shaft body 10, second rotating shaft body 20 and third rotating shaft body 30 are changing in this manner, combinations of the rotation angles of the first rotating shaft body 10, second rotating shaft body 20 and third rotating shaft body 30 do not coincide. A rotation number of the first rotating shaft body 10, and hence a rotation number of the ball screw shaft 71, can be calculated from a combination of the rotation angle of the second rotating shaft body 20 and the rotation angle of the third rotating shaft body 30.

A number (n) of combinations of the rotation angle of the second rotating shaft body 20 and the rotation angle of the third rotating shaft body 30 can be calculated by the following expression (1).

$$n = N_2 \times N_3 = 24 \times 23 = 552 \quad (1)$$

In this expression,
n represents the number of combinations of the rotation angles of the second rotating shaft body 20 and third rotating shaft body 30 corresponding with rotation numbers of the first rotating shaft body 10,
$N_2$ represents the number of teeth of the second gear 20a of the second rotating shaft body 20, and
$N_3$ represents the number of teeth of the third gear 30a of the third rotating shaft body 30.

The CPU 52a calculates a rotation number of the first rotating shaft body 10 from a combination of a rotation angle of the second rotating shaft body 20 and a rotation angle of the third rotating shaft body 30 as illustrated above. According to the above description, the CPU 52a calculates a rotation number of the first rotating shaft body 10 (the output shaft 61a) in addition to rotation angles (absolute angles) of the first, second and third rotating shaft bodies 10, 20 and 30 and the output shaft 61a. The rotation angles and rotation numbers of the output shaft 61a and the ball screw shaft 71 are the same as the rotation angle and rotation number of the first rotating shaft body 10. Thus, the CPU 52a also calculates the rotation angle and rotation number of the output shaft 61a and the ball screw shaft 71. According to the above description, the calculation of the rotation angles and rotation numbers of the output shaft 61a and ball screw shaft 71 is completed by the CPU 52a.

Then, as shown in FIG. 8, the CPU 52a outputs signals corresponding to the calculated rotation angle and rotation number of the output shaft 61a to the controller 200 via the communication component 52b.

As shown in FIG. 2 and FIG. 8, the signals corresponding to the rotation angle and rotation number of the output shaft 61a are inputted to the controller 200 from the CPU 52a. The controller 200 calculates an absolute position of the moving body 90 from the rotation number and rotation angle of the output shaft 61a and a thread groove pitch of the ball screw shaft 71. According to the above description, calculation of the absolute position of the moving body 90 is completed by the controller 200.

As described above and as shown in FIG. 4A and FIG. 4B, in the encoder 1 according to the present exemplary embodiment, the first bearing 12 surrounds the periphery of the first permanent magnet 11 and is formed of the magnetic shielding material that shields magnetism generated by the first permanent magnet 11. Consequently, a length of the first rotating shaft body 10 in the Y-axis direction, which is the shaft axis direction, may be reduced. As a result, the size of an encoder according to the present invention may be reduced.

Figure 10:
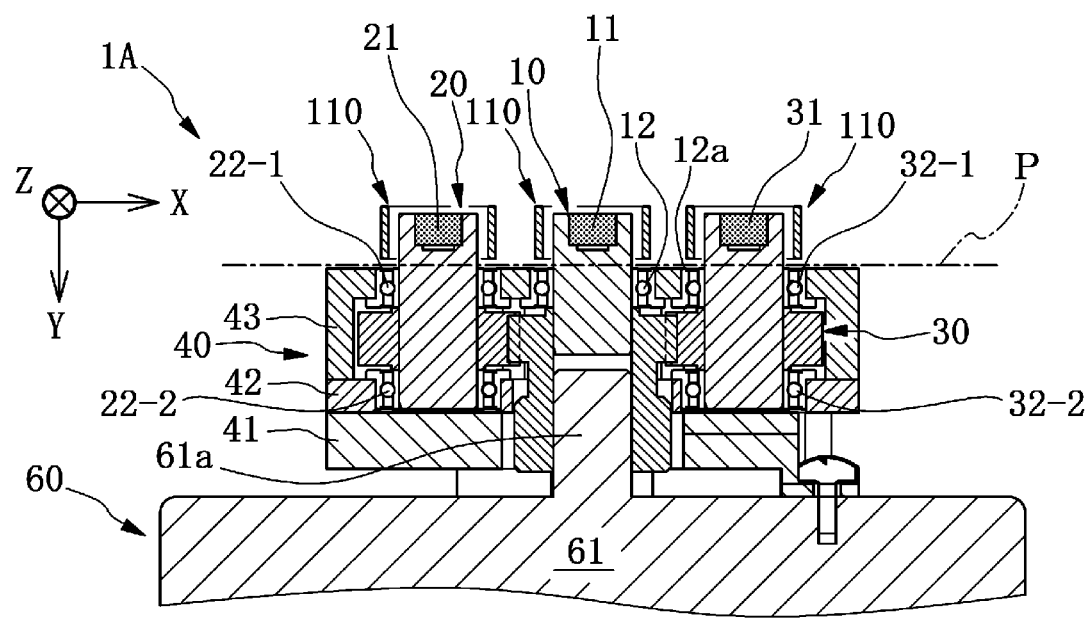
FIG. 10 is a sectional diagram of an encoder according to a comparative example.

For example, in an encoder 1A according to a comparative example as shown in FIG. 10, the first bearing 12 is provided to not surround the periphery of the first permanent magnet 11. In this comparative example, the −Y side end portion of the first rotating shaft body 10 is provided protruding from the −Y side end face 12a of the first bearing 12. Correspondingly, a length of the first rotating shaft body 10 in the Y-axis direction, which is the shaft axis direction, may be longer and the size of the encoder 1A may be larger. Hence, a motor unit equipped with the encoder 1A and an actuator equipped with the motor unit may be larger in size.

By contrast, in the encoder 1 according to the present exemplary embodiment as shown in FIG. 4A and FIG. 4B, the first bearing 12 is formed to surround the periphery of the first permanent magnet 11. Therefore, the first rotating shaft body 10 may be provided such that the −Y side end portion of the first rotating shaft body 10 does not protrude from the −Y side end face 12a of the first bearing 12. Therefore, the length of the first rotating shaft body 10 in the Y-axis direction may be reduced; that is, a smaller profile may be achieved. Thus, the present exemplary embodiment may provide the encoder 1 and the like that may suppress an increase in size.

In the encoder 1A according to the comparative example as shown in FIG. 10, the −Y side end portion of the first rotating shaft body 10 protrudes from the −Y side end face 12a of the first bearing 12. Therefore, in the encoder 1A, in order to reduce effects of magnetism by the first permanent magnet 11 on the sensors S2 and S3 that detect changes in magnetic flux density of the second permanent magnet 21 and third permanent magnet 31, it is necessary to provide a separate magnetic shielding member 110 that shields magnetism generated by the first permanent magnet 11 by surrounding the periphery of the first permanent magnet 11 that is provided at a protruding portion of the first bearing 12.

In the present exemplary embodiment, by contrast, in addition to the fundamental function of rotatably supporting the first rotating shaft body 10 with respect to the case 40, the first bearing 12 is additionally provided with the function of shielding magnetism of the first permanent magnet 11 so as to reduce effects of magnetism produced by the first permanent magnet 11 on the sensors S2 and S3, which are separate from the sensor S1 that detects changes in magnetic flux density of the first permanent magnet 11. Thus, in the encoder 1 according to the present exemplary embodiment, there is no need to prepare a magnetic shielding member separately from the first bearing 12, and a number of components may be reduced compared to the encoder 1A according to the comparative example. As described above, in the encoder 1 according to the present exemplary embodiment, a reduction in component count and a smaller profile of the encoder 1 may be achieved.

In the encoder 1 according to the present exemplary embodiment, the second bearing 22 surrounds the periphery of the second permanent magnet 21 and is formed of the magnetic shielding material that shields magnetism produced by the second permanent magnet 21. Therefore, the length of the second rotating shaft body 20 in the Y-axis direction, which is the shaft axis direction, may be reduced. Similarly, the third bearing 32 surrounds the periphery of the third permanent magnet 31 and is formed of the magnetic shielding material that shields magnetism produced by the third permanent magnet 31. Therefore, the length of the third rotating shaft body 30 in the Y-axis direction, which is the shaft axis direction, may be reduced. As a result, the size of the encoder 1 according to the present exemplary embodiment may be reduced further.

In the present exemplary embodiment, in addition to the fundamental function of rotatably supporting the second rotating shaft body 20 with respect to the case 40, the second bearing 22 is additionally provided with the function of shielding magnetism of the second permanent magnet 21 so as to reduce effects of magnetism produced by the second permanent magnet 21 on the sensors S1 and S3, which are separate from the sensor S2 that detects changes in magnetic flux density of the second permanent magnet 21. Similarly, in addition to the fundamental function of rotatably supporting the third rotating shaft body 30 with respect to the case 40, the third bearing 32 is additionally provided with the function of shielding magnetism of the third permanent magnet 31 so as to reduce effects of magnetism produced by the third permanent magnet 31 on the sensors S1 and S2, which are separate from the sensor S3 that detects changes in magnetic flux density of the third permanent magnet 31. Thus, in the encoder 1 according to the present exemplary embodiment, there is no need to prepare magnetic shielding members separately from the second bearing 22 and third bearing 32, and the number of components may be further reduced.

The present exemplary embodiment is described above, but the present invention is not limited by the above exemplary embodiment.

Figure 11:
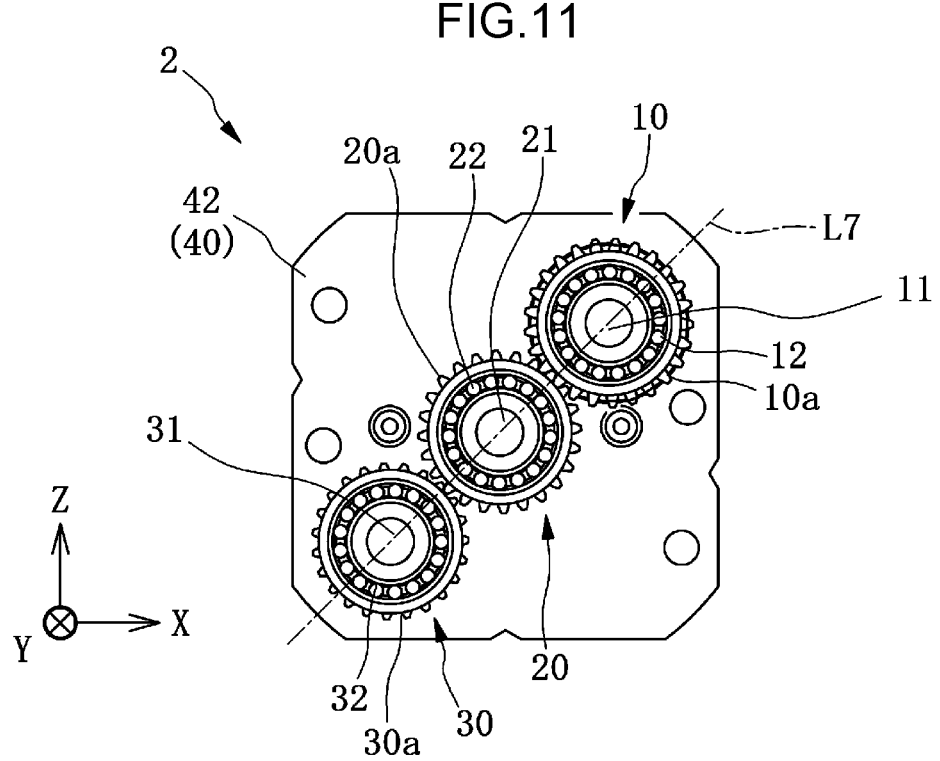
FIG. 11 is a front view of an encoder according to a first variant example.

For example, in the present exemplary embodiment as shown in FIG. 4A, the third gear 30a of the third rotating shaft body 30 that is constituted as a passive drive shaft meshes with the first gear 10a of the first rotating shaft body 10 that is constituted as the main drive shaft, but this is not limiting. As in an encoder 2 according to a first variant example that is shown in FIG. 11, the third gear 30a of the third rotating shaft body 30 may be meshed with the second gear 20a of the second rotating shaft body 20 that is likewise constituted as a passive drive shaft. In this variant example, the third rotating shaft body 30 rotates in conjunction with rotation of the first rotating shaft body 10, in accordance with the meshing between the first gear 10a and the second gear 20a and the meshing between the second gear 20a and the third gear 30a.

In the present exemplary embodiment as shown in FIG. 4B, the second permanent magnet 21 is provided at the end portion of the second rotating shaft body 20 at the −Y side, which is the same side as the end portion of the first rotating shaft body 10 at which the first permanent magnet 11 is provided, but this is not limiting. As in an encoder 3 according to a second variant example that is shown in FIG. 12, the second permanent magnet 21 may be provided at an end portion of the second rotating shaft body 20 at the +Y side, which is the opposite side from the end portion of the first rotating shaft body 10 at which the first permanent magnet 11 is provided. Similarly, the third permanent magnet 31 may be provided at an end portion of the third rotating shaft body 30 at the +Y side, which is the opposite side from the end portion of the first rotating shaft body 10 at which the first permanent magnet 11 is provided.

In the present exemplary embodiment as shown in FIG. 4B, the first permanent magnet 11 is provided such that a portion thereof is exposed from the end portion of the first rotating shaft body 10, but this is not limiting. As in an encoder 4 according to a third variant example that is shown in FIG. 13, the first permanent magnet 11 may be embedded in an end portion of the first rotating shaft body 10, provided magnetic flux from the first permanent magnet 11 embedded in the first rotating shaft body 10 leaks out to an extent that enables sufficiently accurate detection by the sensor S1. In this variant example, the first permanent magnet 11 is disposed in a state that is not exposed from the end portion of the first rotating shaft body 10. Similarly, the second permanent magnet 21 and the third permanent magnet 31 may be disposed in states that are not exposed from the end portion of the second rotating shaft body 20 and the end portion of the third rotating shaft body 30, provided magnetic fluxes from the second and third permanent magnets 21 and 31 that are embedded in the second and third rotating shaft bodies 20 and 30 leak out to extents that enable sufficiently accurate detection by the sensors S2 and S3.

In the encoder 1 according to the present exemplary embodiment as shown in FIG. 4B, three rotating shaft bodies are provided, the first rotating shaft body 10, the second rotating shaft body 20 and the third rotating shaft body 30. However, the number of rotating shaft bodies is not limited thus. Only two rotating shaft bodies may be provided, the first rotating shaft body 10 and the second rotating shaft body 20, and only one rotating shaft body may be provided, the first rotating shaft body 10. Further, as in a fourth variant example shown in FIG. 14, an encoder 5 may be provided with a fourth rotating shaft body 120 in addition to the first rotating shaft body 10, second rotating shaft body 20 and third rotating shaft body 30. Further yet, an encoder may be provided with five or more rotating shaft bodies.

Figure 16:
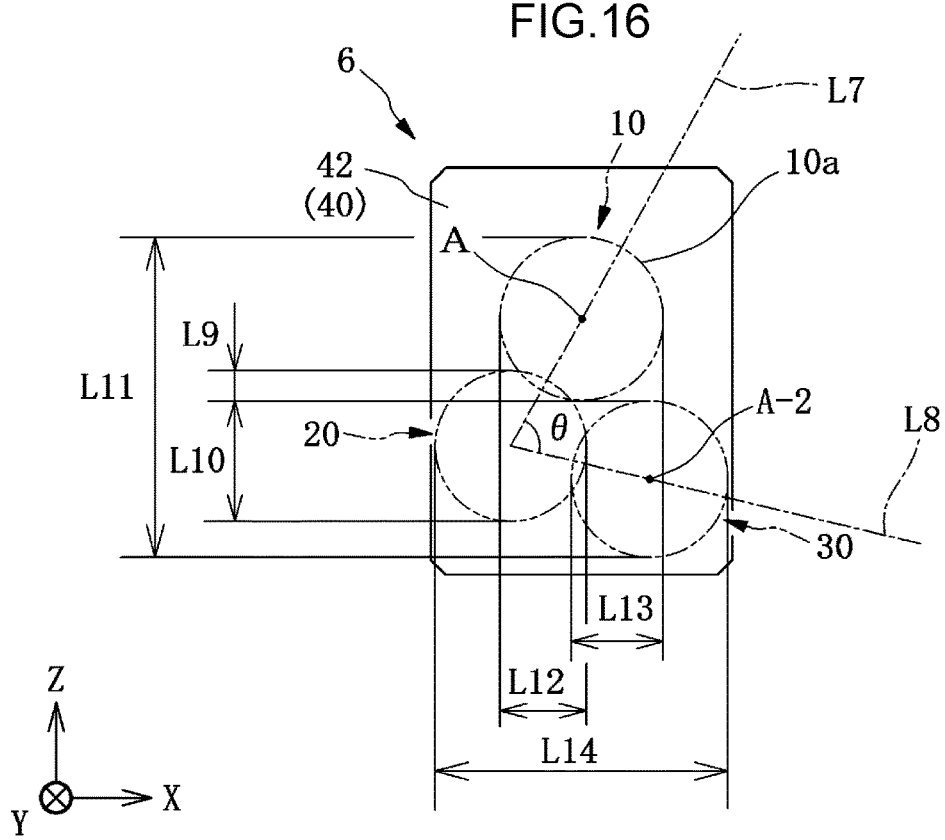
FIG. 16 is a simplified front view showing portions of the encoder according to the fifth variant example.

In the encoder 1 according to the present exemplary embodiment and the encoder 2 according to the first variant example, as shown in FIG. 4A, the first rotating shaft body 10, second rotating shaft body 20 and third rotating shaft body 30 are disposed in a row along the line L7 that passes through the axial center A of the first rotating shaft body 10 and is orthogonal to the Y-axis direction, but this is not limiting. One or two of the first rotating shaft body 10, the second rotating shaft body 20 and the third rotating shaft body 30 may be disposed to be offset from the line L7. For example, as in an encoder 6 according to a fifth variant example that is shown in FIG. 15 and FIG. 16, the third rotating shaft body 30 alone may be disposed away from the line L7. In this variant example, a line L8 passes through both an axial center A-2 of the third rotating shaft body 30 and an axial center of the second rotating shaft body and is orthogonal to the Y-axis direction. The size of the encoder 6 may be reduced by reducing an angle θ between the line L7 and the line L8.

More specifically, a length (overlap amount) L9 by which the first rotating shaft body 10 and the second rotating shaft body 20 overlap in the Z-axis direction in the X-Z plane may be increased. Similarly, a length (overlap amount) L10 by which the second rotating shaft body 20 and the third rotating shaft body 30 overlap in the Z-axis direction in the X-Z plane may be increased. A length L11 in the Z-axis direction in the X-Z plane from a +Z side end portion of the first rotating shaft body 10 to a −Z side end portion of the third rotating shaft body 30 may be reduced by increasing the overlap lengths (overlap amounts) L9 and L10.

Furthermore, a length (overlap amount) L12 by which the second rotating shaft body 20 and the first rotating shaft body 10 overlap in the X-axis direction in the X-Z plane may be increased. Similarly, a length (overlap amount) L13 by which the first rotating shaft body 10 and the third rotating shaft body 30 overlap in the X-axis direction in the X-Z plane may be increased. A length L14 in the X-axis direction in the X-Z plane from a −X side end portion of the second rotating shaft body 20 to a +X side end portion of the third rotating shaft body 30 may be reduced by increasing the overlap lengths (overlap amounts) L12 and L13.

Because the lengths L11 and L14 may be reduced, the size of the encoder 6 may be reduced as a result.

In the encoder 1 according to the exemplary embodiment as shown in FIG. 4A and FIG. 4B, the −Y side end faces of the first permanent magnet 11, the first rotating shaft body 10 and the first bearing 12 are structured to be substantially coplanar, but this is not limiting. For example, one or both of the −Y side end portions of the first bearing 12 and the first rotating shaft body 10 may protrude further to the −Y side (the side at which the sensor S1 is disposed) than the end portion of the first permanent magnet 11.

Figure 17:
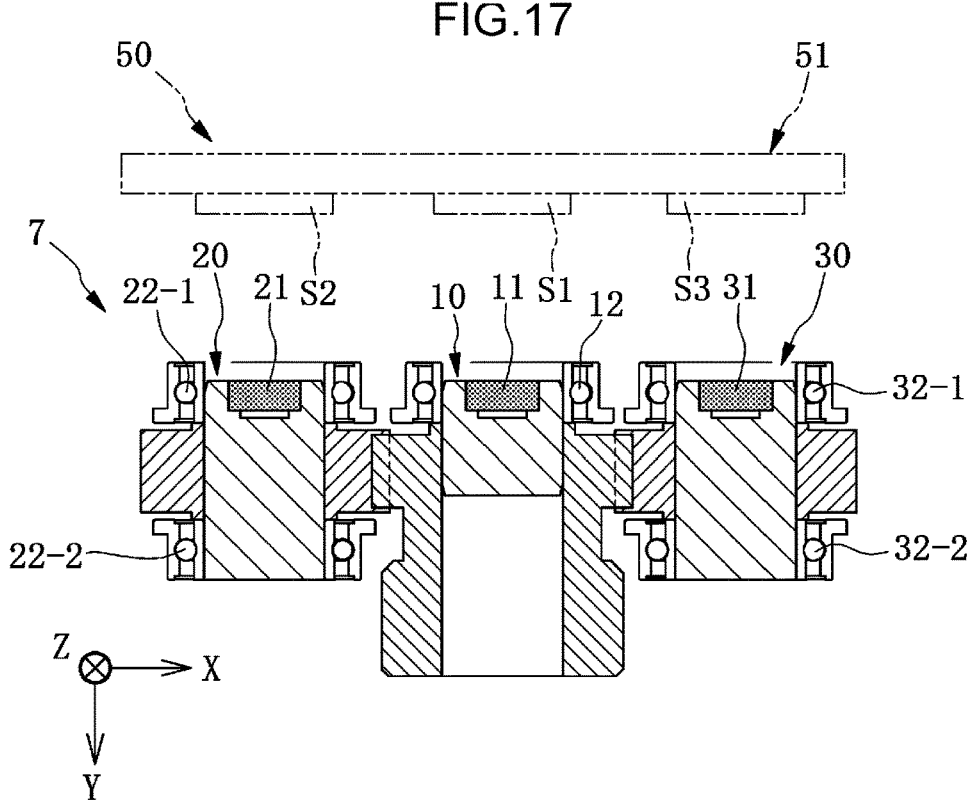
FIG. 17 is a sectional diagram of an encoder according to a sixth variant example.

More specifically, for example, as in an encoder 7 according to a sixth variant example that is shown in FIG. 17, the −Y side end portion of the first bearing 12 may protrude further to the −Y side (the side at which the sensor S1 is disposed) than the −Y side end portions of the first permanent magnet 11 and the first rotating shaft body 10. According to this structure, the −Y side end portions of the first permanent magnet 11 and the first rotating shaft body 10 are formed to be recessed from the −Y side end portion of the first bearing 12.

In the encoder 7, magnetic flux from the first permanent magnet 11 leaking out to the sensors S2 and S3 may be reduced. Thus, the magnetism interference reduce effect may be further enhanced.

Figure 18:
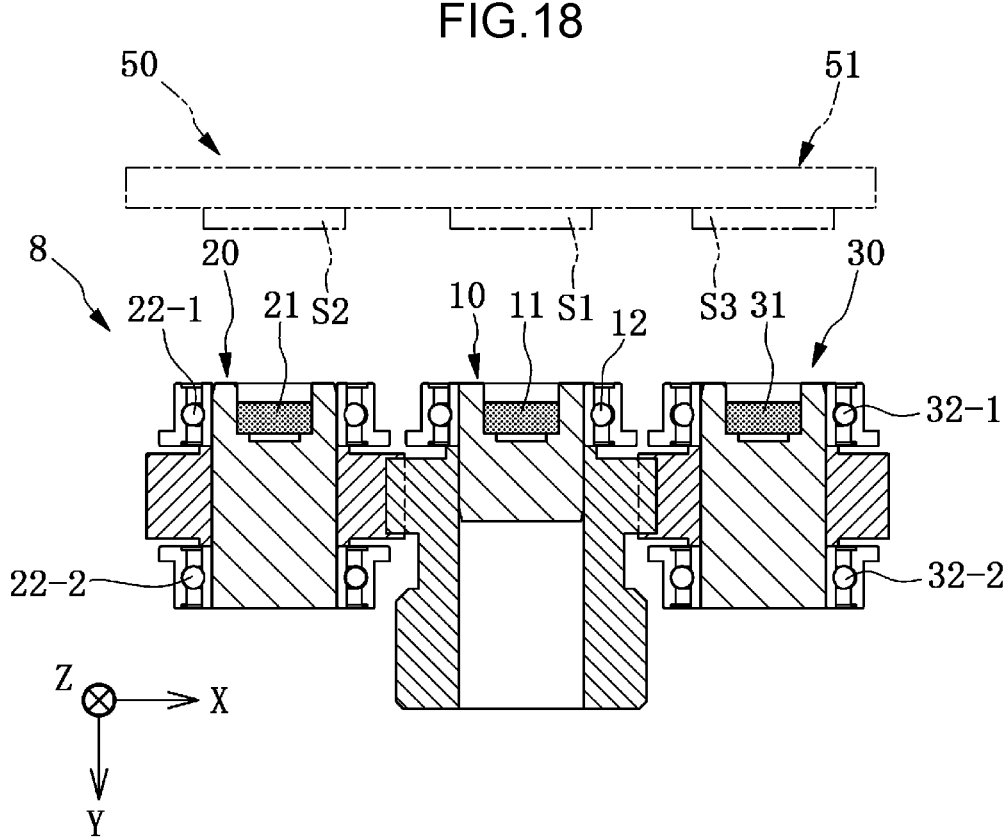
FIG. 18 is a sectional diagram of an encoder according to a seventh variant example.

As in an encoder 8 according to a seventh variant example that is shown in FIG. 18, the −Y side end portion of the first rotating shaft body 10 may protrude further to the −Y side (the side at which the sensor S1 is disposed) than the −Y side end portion of the first permanent magnet 11. In the encoder 8, the −Y side end portion of the first rotating shaft body 10 is structured to be substantially coplanar with the −Y side end portion of the first bearing 12. According to this structure, the −Y side end portion of the first permanent magnet 11 is formed so as to be recessed from the −Y side end portions of the first bearing 12 and the first rotating shaft body 10.

In the encoder 8, magnetic flux from the first permanent magnet 11 leaking out to the sensors S2 and S3 may be reduced. Thus, the magnetism interference reduce effect may be further enhanced.

Positional relationships of the end portions of the second permanent magnet 21, the second rotating shaft body 20 and the second bearing 22-1 and positional relationships of the end portions of the third permanent magnet 31, the third rotating shaft body 30 and the third bearing 32-1 are similar to the positional relationships of the end portions of the first permanent magnet 11, the first rotating shaft body 10 and the first bearing 12. Therefore, in the encoders 7 and 8, magnetic flux from the second permanent magnet 21 and magnetic flux from the third permanent magnet 31 leaking out to the other sensors may be reduced. That is, the magnetism interference reduce effect may be further enhanced.

As shown in FIG. 1 and FIG. 2, the actuator 100 according to the exemplary embodiment is a slider-type actuator in which the slide cover C moves in the linear motion direction D1, but this is not limiting. The actuator 100 may be a rod-type actuator in which a rod moves in the linear motion direction D1.

The actuator 100 according to the exemplary embodiment is equipped with the ball screw 70. Thus, the actuator 100 converts rotational movement of the output shaft 61a of the motor unit 60 to linear movement of the moving body 90 in accordance with the threading engagement of the ball screw shaft 71 of the ball screw 70 with the ball screw nut 72. However, structures and shapes of the actuator 100 are not limited thus. For example, instead of the ball screw 70, the actuator 100 may be equipped with a timing belt and timing pulley for transmitting rotational movement of the output shaft 61a to the moving body 90.

The present invention encompasses numerous modifications and exemplary embodiments that do not depart from the intent and scope of a broad definition of the present invention. The exemplary embodiment described above is for describing the present invention and does not limit the scope of the present invention.

Explanation of the Reference Symbols 1, 1A, 2, 3, 4, 5, 6, encoders; 10, first rotating shaft body; 10-1, cylindrical member; 10-2, tubular member; 10a, first gear; 10b, penetrating hole; 11, first permanent magnet; 12, first bearing; 12a, end face; 20, second rotating shaft body; 20-1, cylindrical member; 20-2, tubular member; 20a, second gear; 20b, penetrating hole; 21, second permanent magnet; 22-1, 22-2, second bearings; 22a, end face; 30, third rotating shaft body; 30-1, cylindrical member; 30-2, tubular member; 30a, third gear; 30b, penetrating hole; 31, third permanent magnet; 32-1, 32-2, third bearings; 32a, end face; 40, case; 41, first case member; 41a, penetrating hole; 41b, screw hole; 42, second case member; 42a, 42b, 42c, penetrating holes; 42d, screw hole; 43, third case member; 43a, 43b, 43c, penetrating holes; 43d, screw hole; 44, 45, fasteners; 50, sensor unit; 51, circuit board; 52a, CPU; 52b, communication component; 53, support member; 54, connector; 60, motor unit; 61, motor main body (motor); 61a, output shaft (rotating shaft); 62, motor casing; 63, first coupling; 70, ball screw; 71, ball screw shaft; 71a, ball screw shaft main body; 71b, 71c, end portions; 72, ball screw nut; 73, second coupling; 80, actuator housing; 81, base; 82, ball screw nut; 82R, 82L, side covers; 82a, opening portion; 83, seat member; 84, front bracket; 84a, bearing; 85, rear bracket; 85a, bearing; 90, moving body; 91, penetrating hole; 100, actuator; 110, magnetic shielding member; 120, fourth rotating shaft body; 200, controller; S1, sensor (first sensor); S2, sensor (second sensor); S3, sensor (third sensor); C, slide cover; D1, linear motion direction; L1, L2, L3, L4, L5, L6, L9, L10, L11, L12, L13, L14, lengths; L7, L8, lines; A, A-2, axial centers; P, same plane; θ, angle.

The invention claimed is:

1. An encoder for detecting rotation of an output shaft of a motor, the encoder comprising:
   a first rotating shaft body configured to be coupled to an end portion of the output shaft and configured to rotate in conjunction with rotation of the output shaft;
   a first permanent magnet provided at an end portion of the first rotating shaft body;
   a case accommodating the first rotating shaft body;
   a first sensor disposed so as to oppose the first permanent magnet, the first sensor detecting changes in magnetic flux density of the first permanent magnet in accordance with rotation of the first rotating shaft body; and
   a first bearing rotatably supporting the first rotating shaft body with respect to the case, the first bearing surrounding a circumference of the first permanent magnet and being formed of a magnetic shielding material that shields magnetism generated by the first permanent magnet, wherein:
   an end portion of the first bearing at a side of the first sensor, in an axial direction of the first rotating shaft body, is structured to be substantially coplanar with an end portion of the first permanent magnet at the side of the first sensor, in the axial direction of the first rotating shaft body, or the end portion of the first bearing protrudes relative to the end portion of the first permanent magnet, in the axial direction of the first rotating shaft body.

2. The encoder according to claim 1, further comprising:
   a second rotating shaft body configured to rotate in conjunction with rotation of the first rotating shaft body;
   a second permanent magnet provided at the second rotating shaft body;
   a second bearing rotatably supporting the second rotating shaft body with respect to the case; and
   a second sensor disposed so as to oppose the second permanent magnet, the second sensor detecting changes in magnetic flux density of the second permanent magnet in accordance with rotation of the second rotating shaft body.

3. The encoder according to claim 2, wherein:
   the second rotating shaft body is provided with an axial direction thereof being parallel to the axial direction of the first rotating shaft body, and
   the second permanent magnet is provided at an end portion of the second rotating shaft body that is at a same side thereof as the end portion of the first rotating shaft body at which the first permanent magnet is provided.

4. The encoder according to claim 2, wherein:
   the second rotating shaft body is provided with an axial direction thereof being parallel to the axial direction of the first rotating shaft body, and
   the second permanent magnet is provided at an end portion of the second rotating shaft body that is at an opposite side thereof from the end portion of the first rotating shaft body at which the first permanent magnet is provided.

5. The encoder according to claim 2, wherein the second bearing surrounds a circumference of the second permanent magnet and is formed of a magnetic shielding material that shields magnetism generated by the second permanent magnet.

6. The encoder according to claim 5, further comprising:
   a third rotating shaft body configured to rotate in conjunction with rotation of the first rotating shaft body;
   a third permanent magnet provided at the third rotating shaft body;
   a third bearing rotatably supporting the third rotating shaft body with respect to the case; and
   a third sensor disposed so as to oppose the third permanent magnet, the third sensor detecting changes in magnetic flux density of the third permanent magnet in accordance with rotation of the third rotating shaft body.

7. The encoder according to claim 6, wherein the third bearing surrounds a circumference of the third permanent magnet and is formed of a magnetic shielding material that shields magnetism generated by the third permanent magnet.

8. The encoder according to claim 6, wherein:
   a first gear is provided at the first rotating shaft body,
   a second gear is provided at the second rotating shaft body, the second gear meshing with the first gear, and
   the second rotating shaft body rotates in conjunction with rotation of the first rotating shaft body in accordance with the meshing between the first gear and the second gear.

9. The encoder according to claim 8, wherein:
   a third gear is provided at the third rotating shaft body, the third gear meshing with the first gear of the first rotating shaft body, and
   the third rotating shaft body rotates in conjunction with rotation of the first rotating shaft body in accordance with the meshing between the first gear and the third gear.

10. The encoder according to claim 8, wherein:
    a third gear is provided at the third rotating shaft body, the third gear meshing with the second gear of the second rotating shaft body, and
    the third rotating shaft body rotates in conjunction with rotation of the first rotating shaft body in accordance with the meshing between the first gear and the second gear and the meshing between the second gear and the third gear.

11. The encoder according to claim 1, wherein an end portion of the first rotating shaft body in the axial direction of the first rotating shaft body protrudes relative to an end portion of the first permanent magnet in the axial direction of the first rotating shaft body.

12. A motor unit comprising:
    a motor provided with an output shaft; and
    the encoder according to claim 1, the encoder detecting rotation of the output shaft of the motor.

13. An actuator comprising:
    a moving body; and
    the motor unit according to claim 12, the motor unit moving the moving body in accordance with rotation of the output shaft.

* * * * *